(12) United States Patent
Sharma et al.

(10) Patent No.: US 10,755,398 B2
(45) Date of Patent: Aug. 25, 2020

(54) IMAGE DISPLAY APPARATUS, IMAGE DISPLAY METHOD, AND IMAGE PROCESSING METHOD

(71) Applicant: SYSMEX CORPORATION, Kobe-shi, Hyogo (JP)

(72) Inventors: Shruti Sharma, Kobe (JP); Shohei Matsumoto, Kobe (JP)

(73) Assignee: SYSMEX CORPORATION, Hyogo (JP)

( * ) Notice: Subject to any disclaimer, the term of this patent is extended or adjusted under 35 U.S.C. 154(b) by 140 days.

(21) Appl. No.: 15/964,976

(22) Filed: Apr. 27, 2018

(65) Prior Publication Data

US 2018/0315176 A1 Nov. 1, 2018

(30) Foreign Application Priority Data

Apr. 28, 2017 (JP) ................. 2017-090460

(51) Int. Cl.
*G06T 5/00* (2006.01)
*G06T 5/50* (2006.01)
*G06T 7/00* (2017.01)
*A61B 6/00* (2006.01)
*G06T 11/60* (2006.01)

(52) U.S. Cl.
CPC ............. *G06T 5/50* (2013.01); *G06T 5/001* (2013.01); *G06T 5/005* (2013.01); *G06T 7/0012* (2013.01); *G06T 11/60* (2013.01); *G06T 2200/24* (2013.01); *G06T 2207/10056* (2013.01); *G06T 2207/30024* (2013.01)

(58) Field of Classification Search
CPC ............. G06T 5/00; G06T 7/00; G06N 3/00
USPC ........................................... 382/133
See application file for complete search history.

(56) References Cited

U.S. PATENT DOCUMENTS 10,089,728 B2 * 10/2018 Nakamura ............ A61B 6/032
2003/0059849 A1 * 3/2003 Sugahara ................ C07K 1/36
435/7.1

FOREIGN PATENT DOCUMENTS

JP H07-286952 A 10/1995

* cited by examiner

*Primary Examiner* — Abolfazl Tabatabai
(74) *Attorney, Agent, or Firm* — Brinks Gilson & Lione

(57) ABSTRACT

An image display apparatus 120 for imaging and displaying a test substance contained in a sample 111 includes an imaging unit 200 for imaging a test substance, an image processing unit 121 for generating an image 61 for display including an additional image 11c in which the pixel value of each pixel is set in uneven distribution added to at least part of the captured image 11 obtained by the imaging unit 200 and a region 21 of the test substance, and a display unit 123 for displaying the image 61 generated by the image processing unit 121.

28 Claims, 24 Drawing Sheets

FIG. 1A
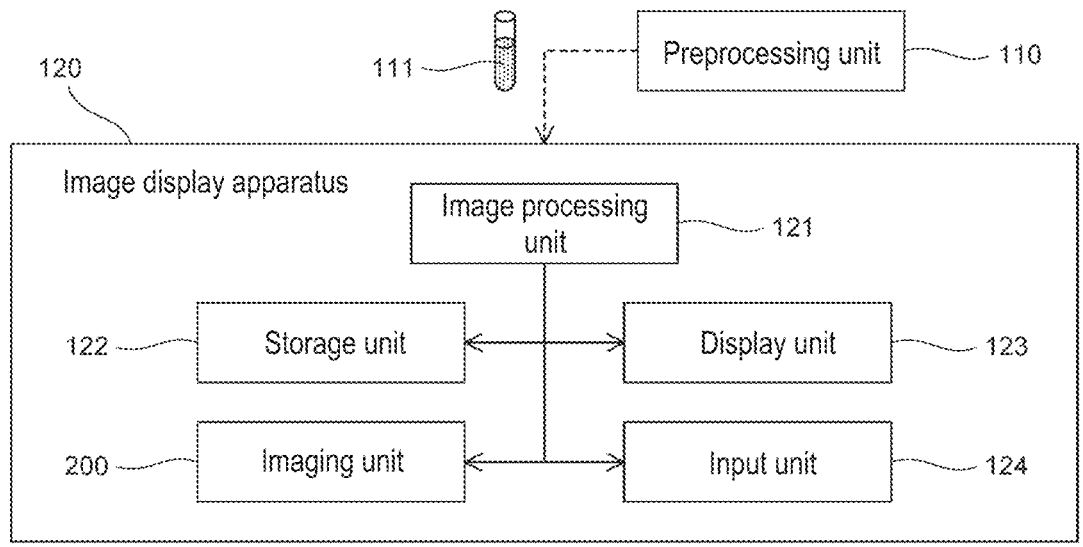
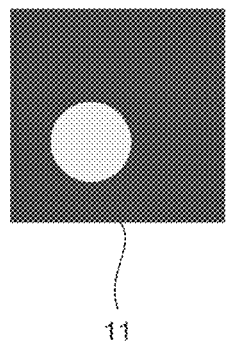
FIG. 1B
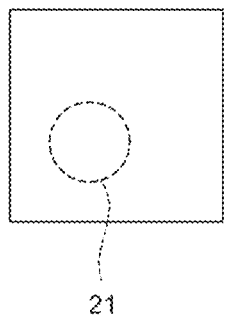
FIG. 1C
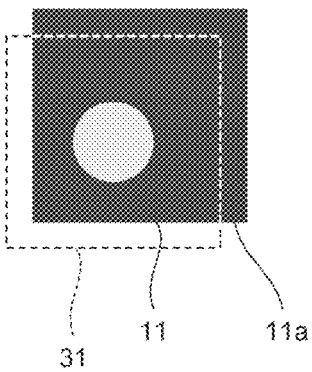
FIG. 1D
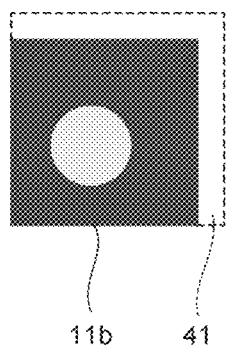
FIG. 1E
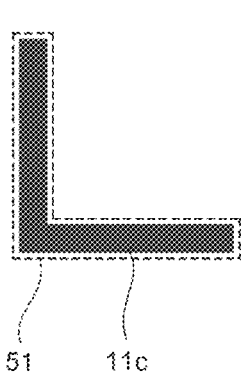
FIG. 1F
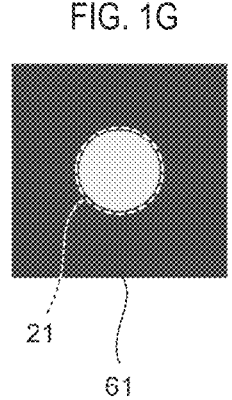
FIG. 1G FIG. 4A Obtain capture image
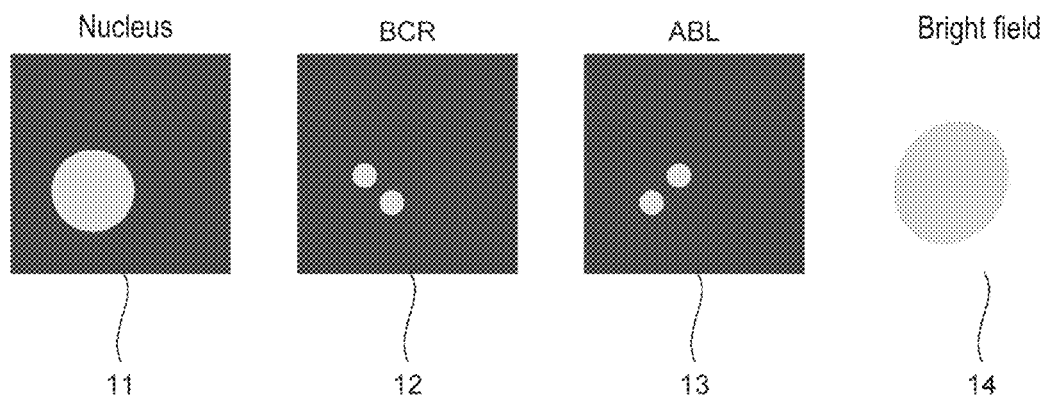
FIG. 4B Extract region
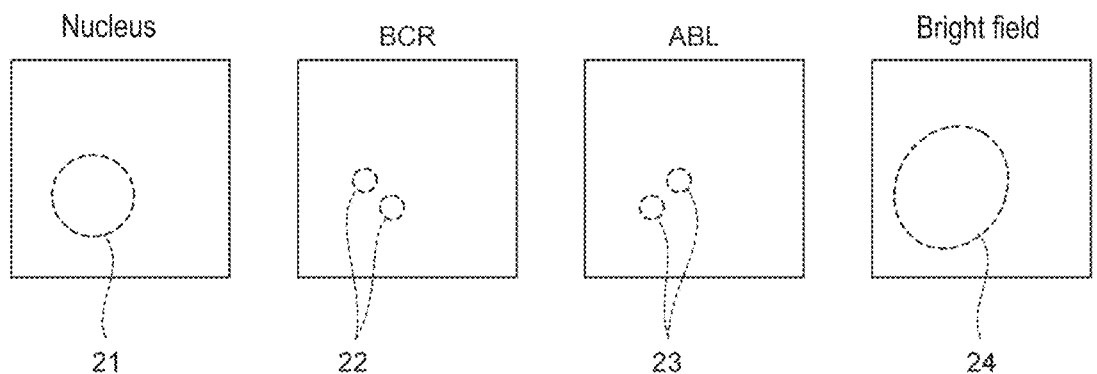
FIG. 4C
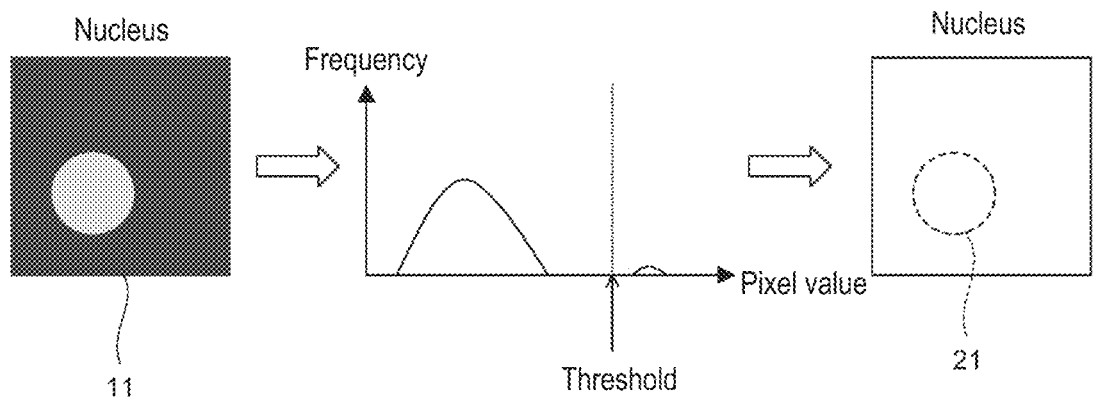

FIG. 5A Set display image region
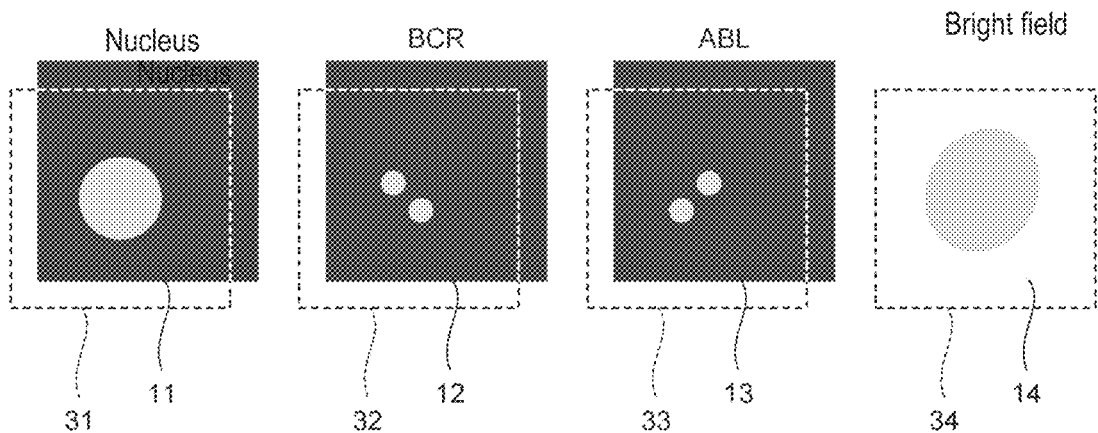
FIG. 5B Set region
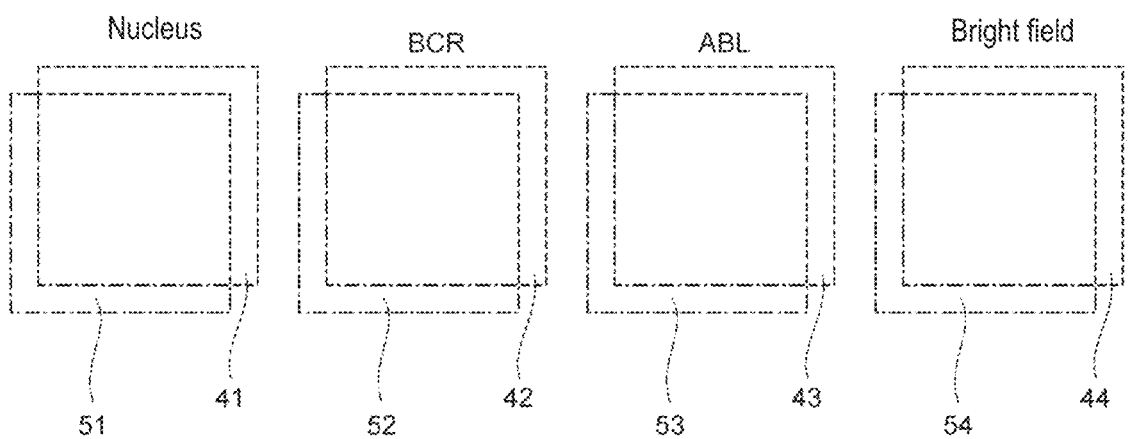
FIG. 5C generate display image
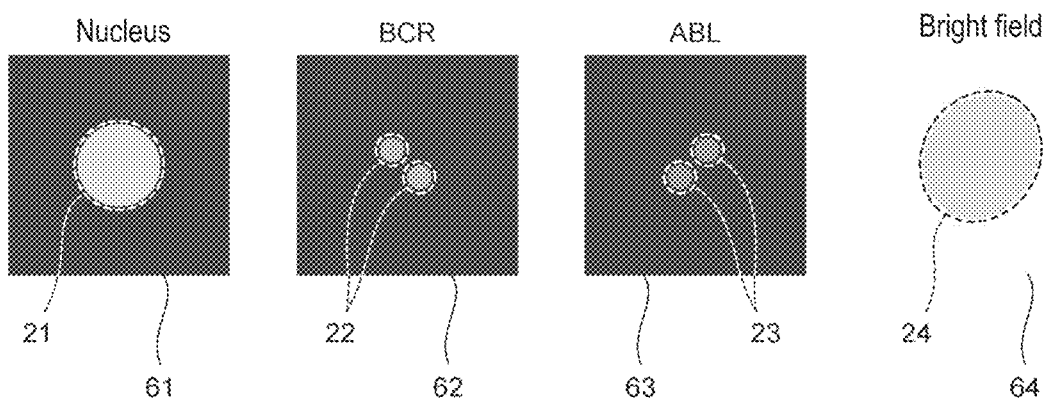

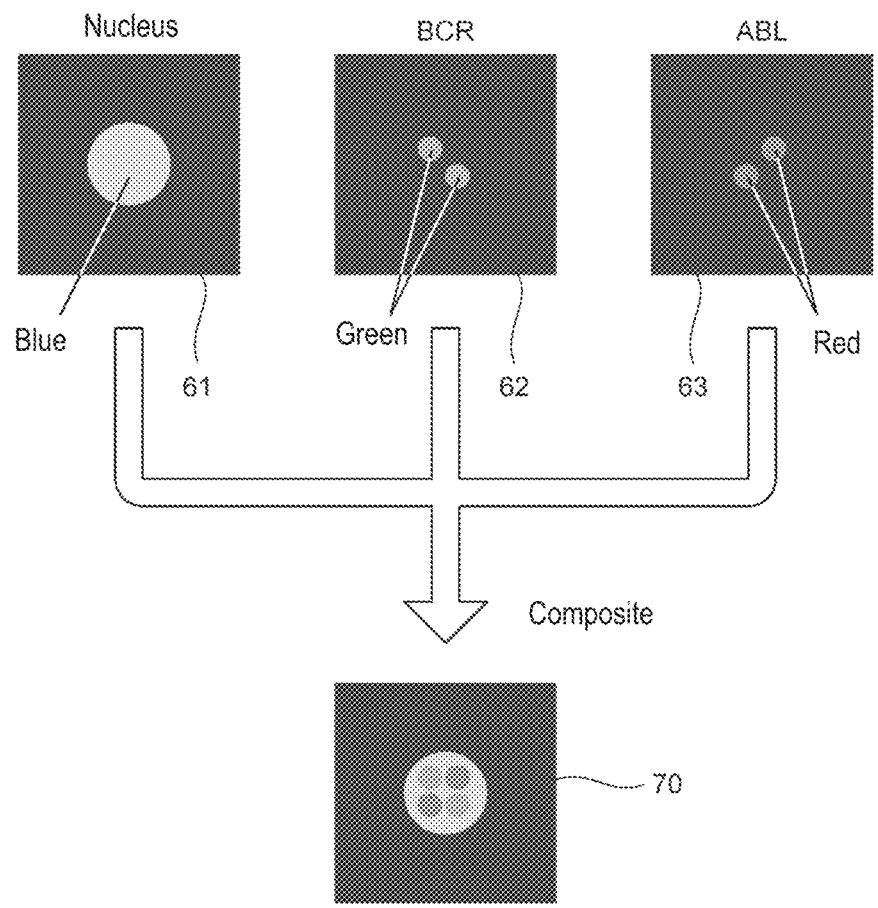
FIG. 7A Generate composite display image
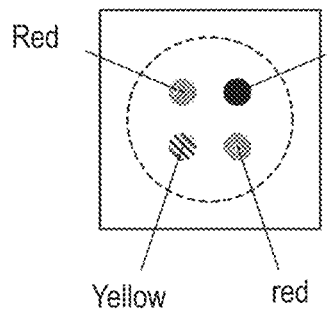
FIG. 7B
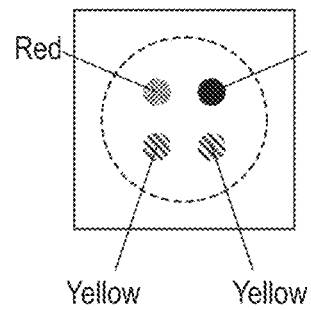
FIG. 7C
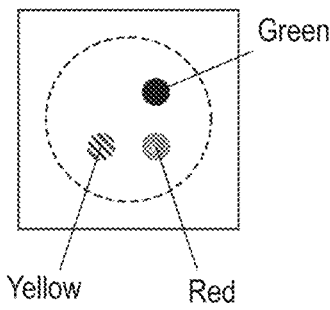
FIG. 7D

FIG. 8

FIG. 10A
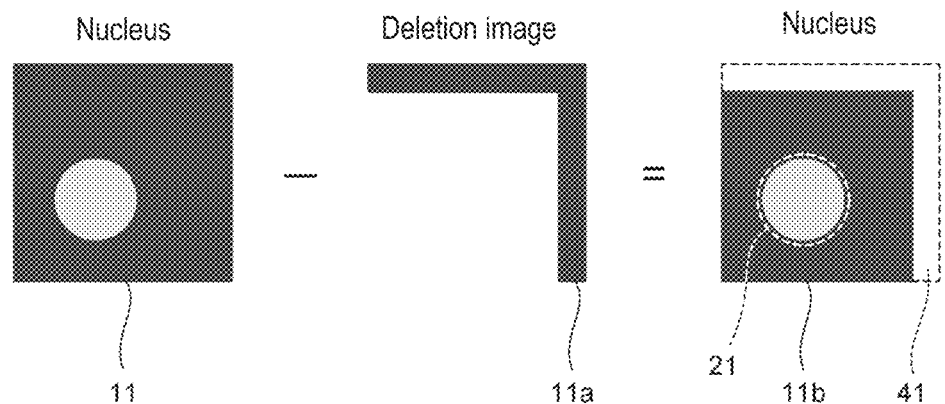
FIG. 10B
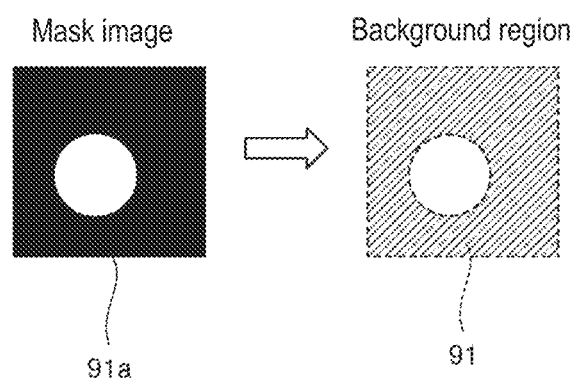
FIG. 10C Modification example
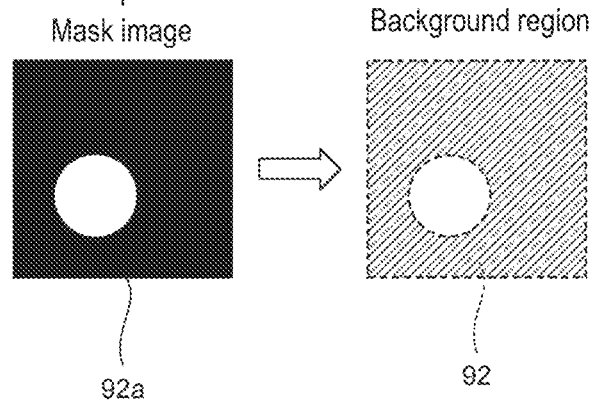

FIG. 12A First embodiment padding process
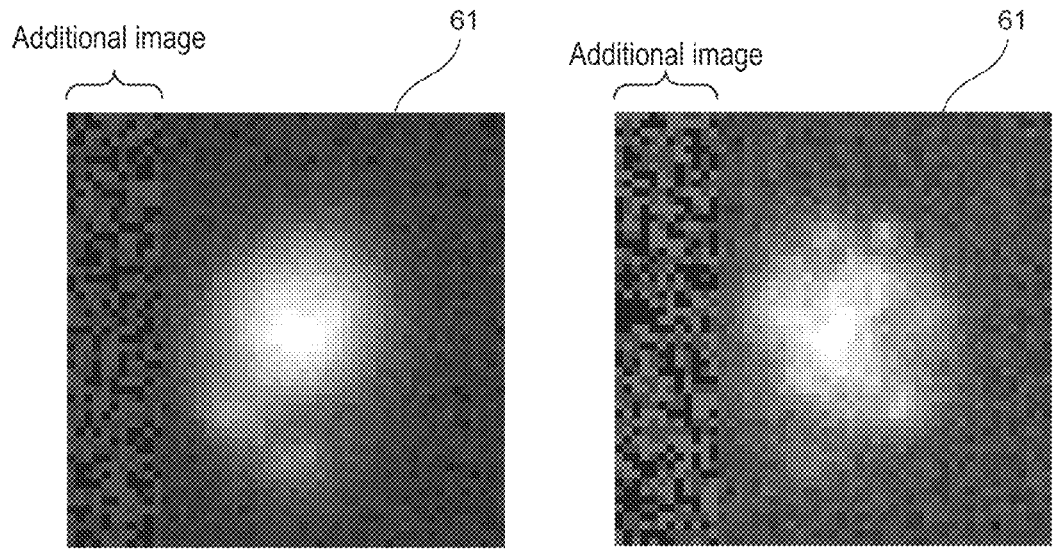
FIG. 12B Comparative example padding process
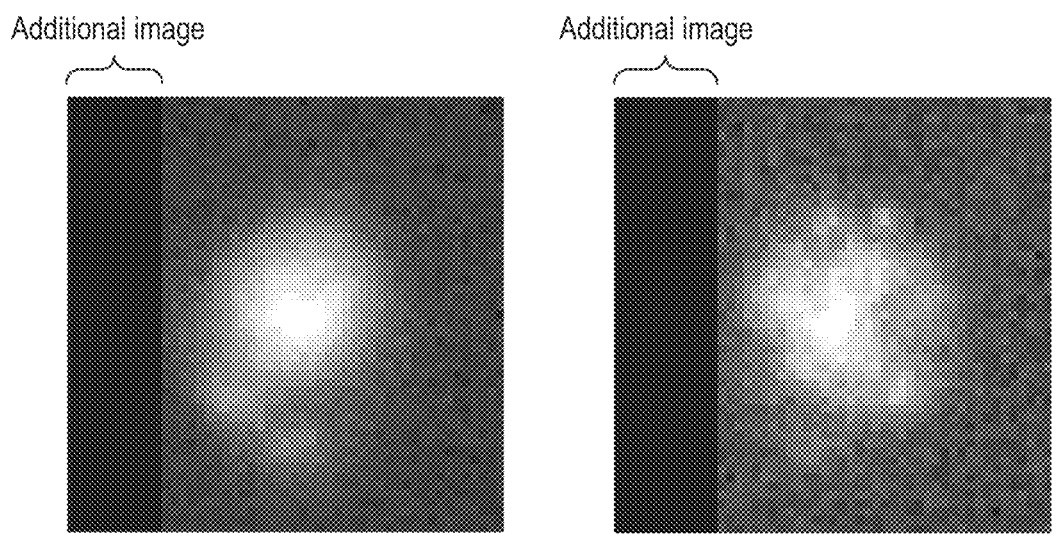

FIG. 13A First embodiment padding process comparative example
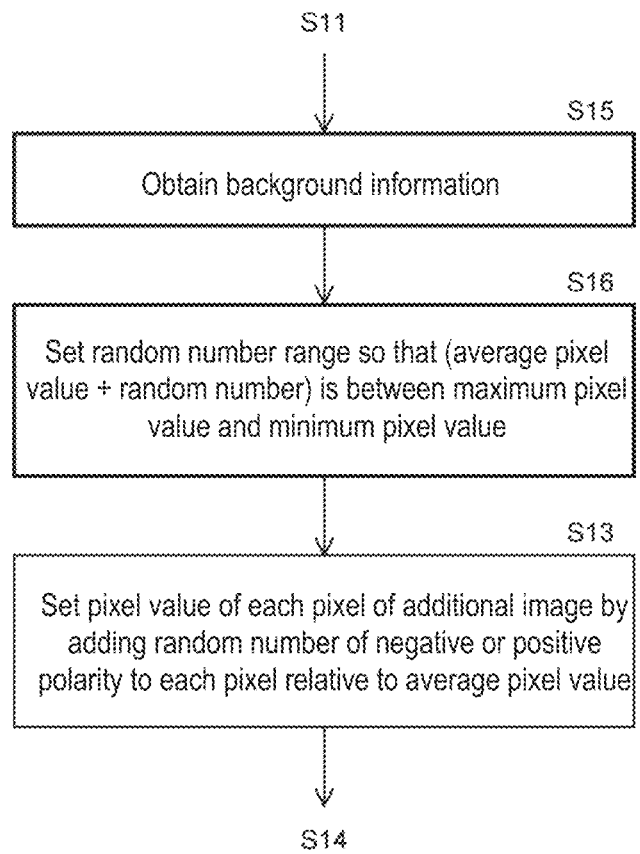
FIG. 13B
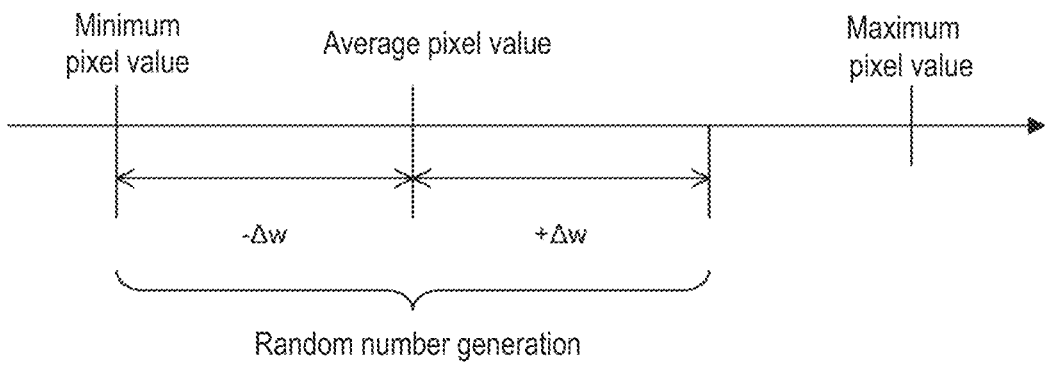

FIG. 14A Second embodiment
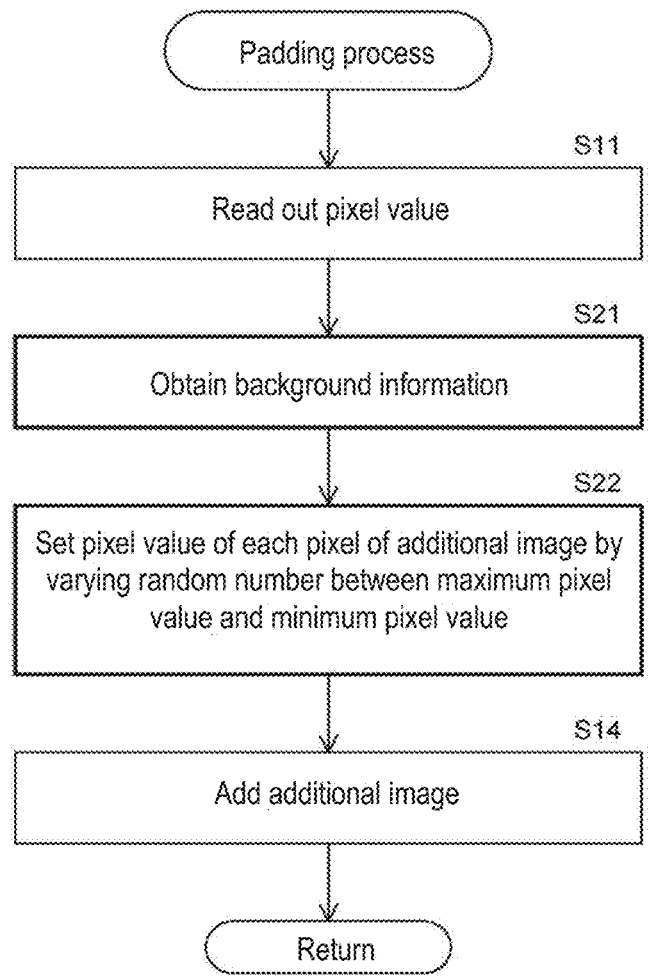
FIG. 14B
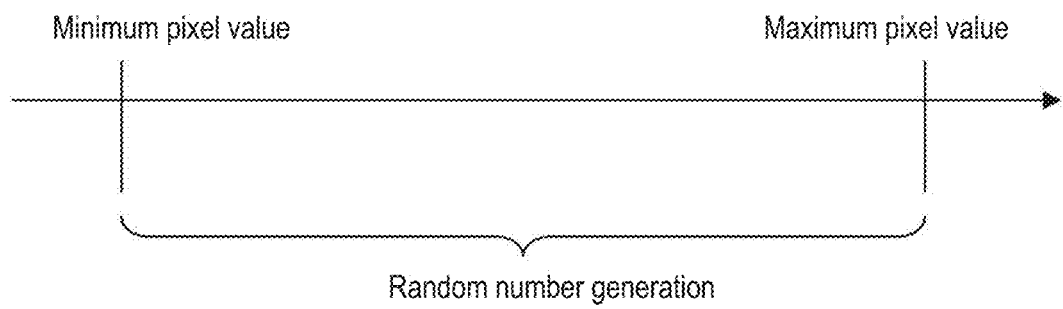

FIG. 15A Second embodiment padding process modification
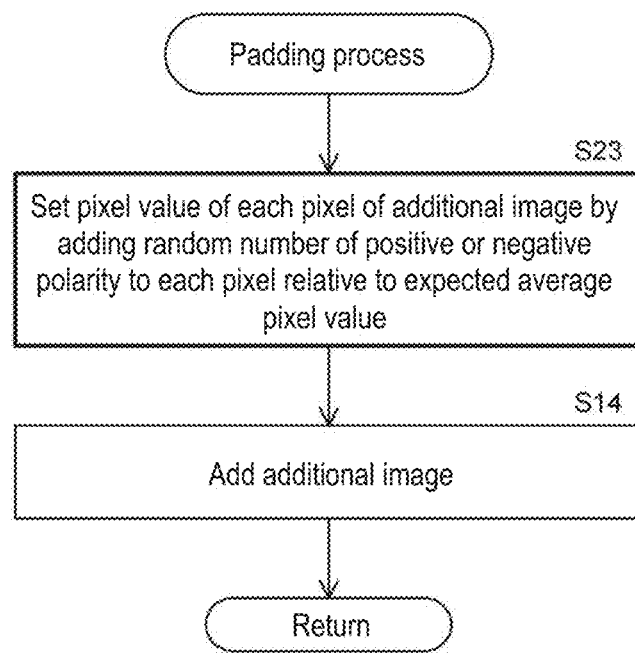
FIG. 15B
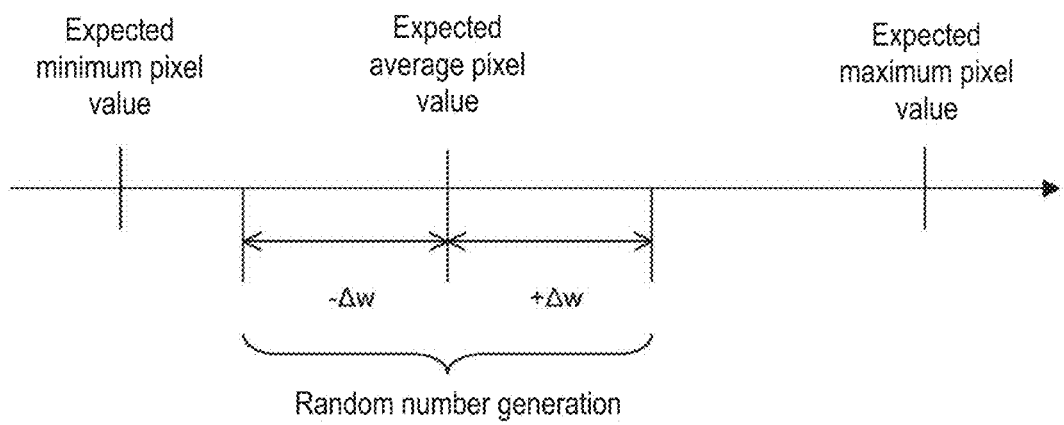

FIG. 16A Third embodiment
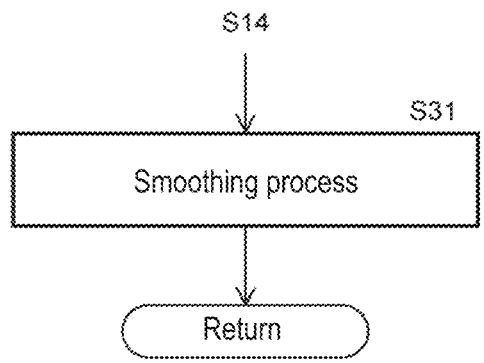
FIG. 16B
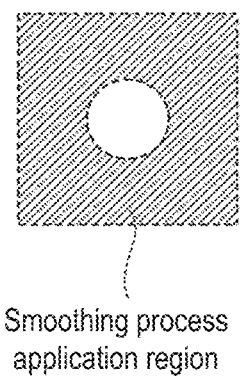
Smoothing process application region
FIG. 16C
| V1 | V2 | V3 |
|----|----|----|
| V4 | Vx | V5 |
| V6 | V7 | V8 |
Vx=(V1+V2+ ··· +V8)/8
FIG. 16D
| (V3) | V2 | V3 |
|------|----|----|
| (V5) | Vx | V5 |
| (V3) | (V2) | (V3) |
Vx=(2V2+4V3+2V5)/8
FIG. 16E
| V1 | V2 | V3 |
|----|----|----|
| V4 | Vx | V5 |
| (V1) | (V2) | (V3) |
Vx=(2V1+2V2+2V3+V4+V5)/8
FIG. 16F
| V1 | V2 | V3 |
|----|----|----|
| V4 | Vx | V5 |
| V6 | V7 | V8 |
Additional image ←→ Original image
Vx=(V1+V2+ ··· +V8)/8

FIG. 17B Modification

FIG. 17C Modification $Vx=(V1+V2+V3+V4)/4$ $Vx=(V1+V2+ \cdots +V24)/24$

FIG. 18A Fourth embodiment padding process
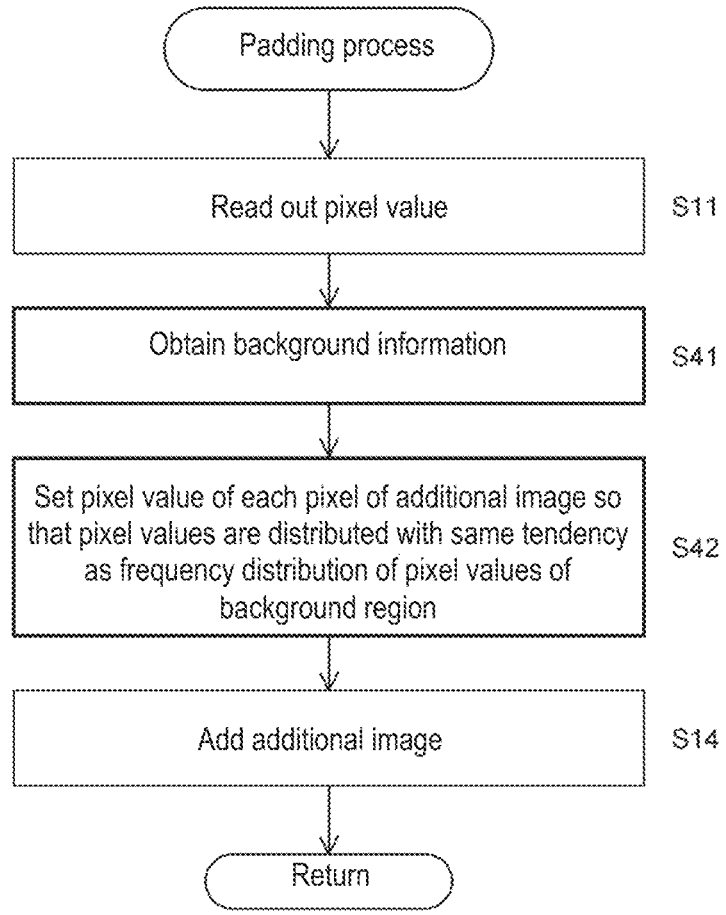
FIG. 18B
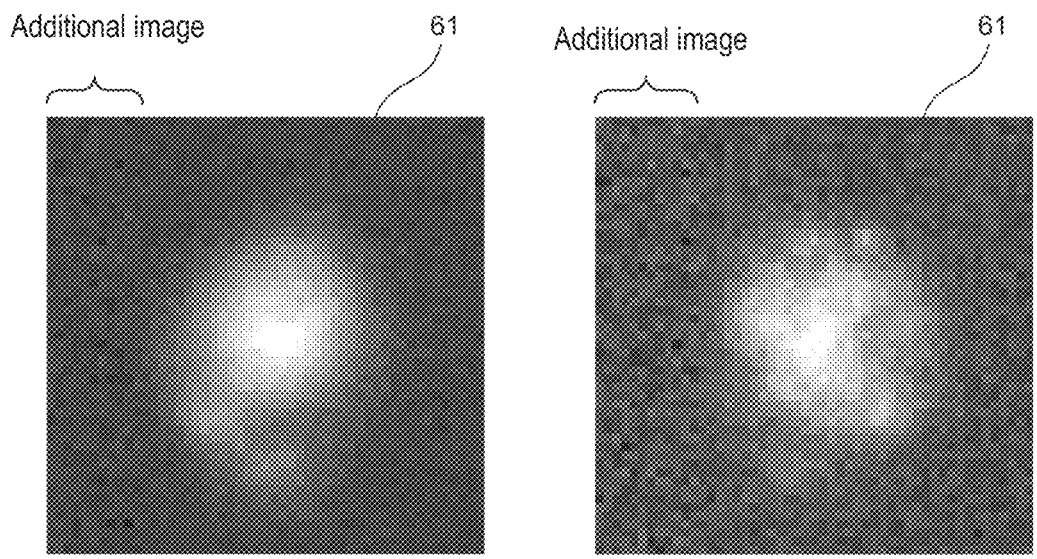

FIG. 19A Probability density function (standard Gaussian distribution)
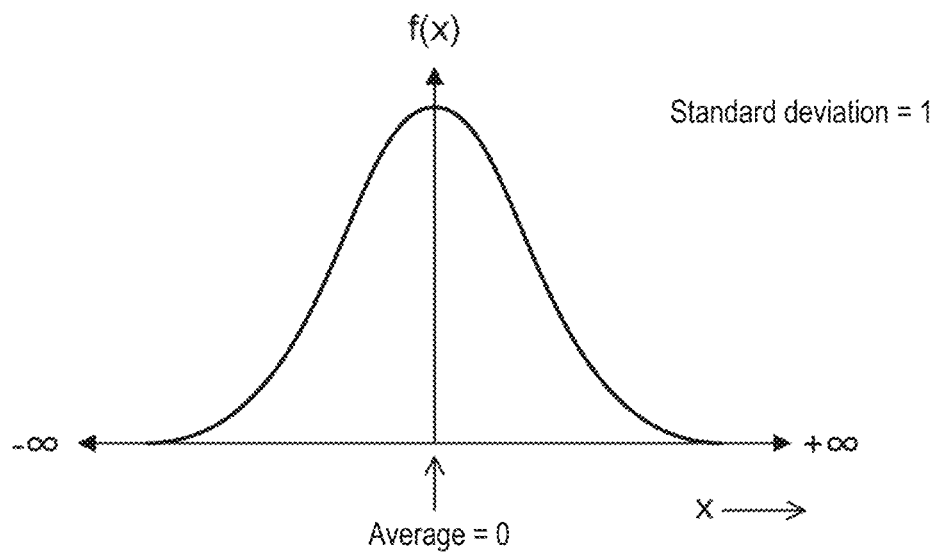
FIG. 19B Probability density function (restricted Gaussian distribution)
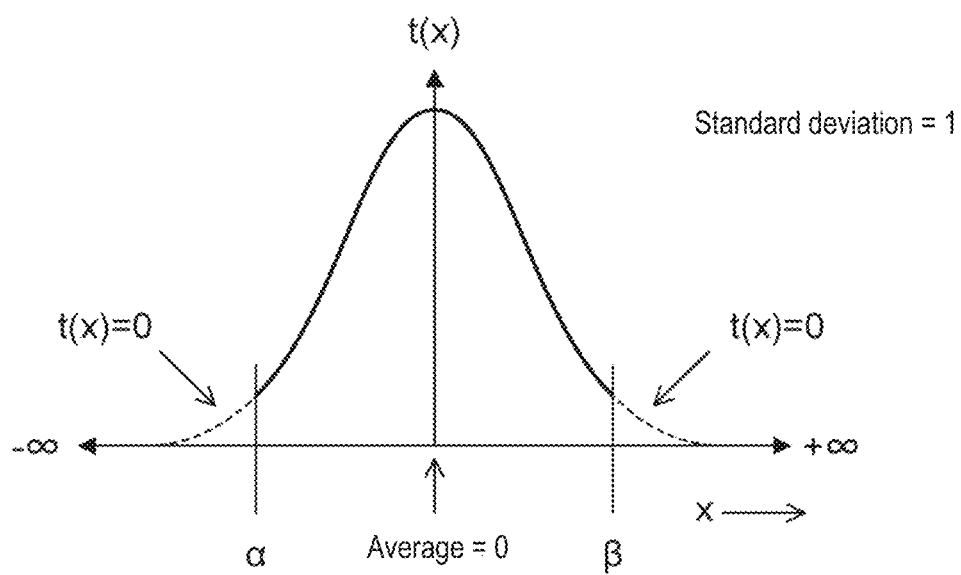

FIG. 20A Cumulative distribution function (restricted Gaussian distribution)
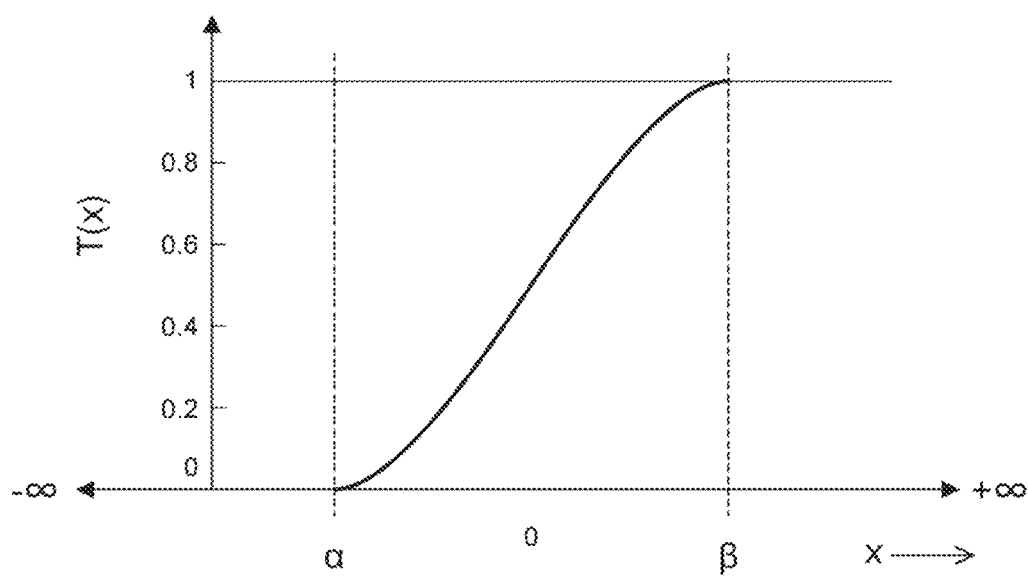
FIG. 20B Cumulative distribution inverse function (restricted Gaussian distribution)
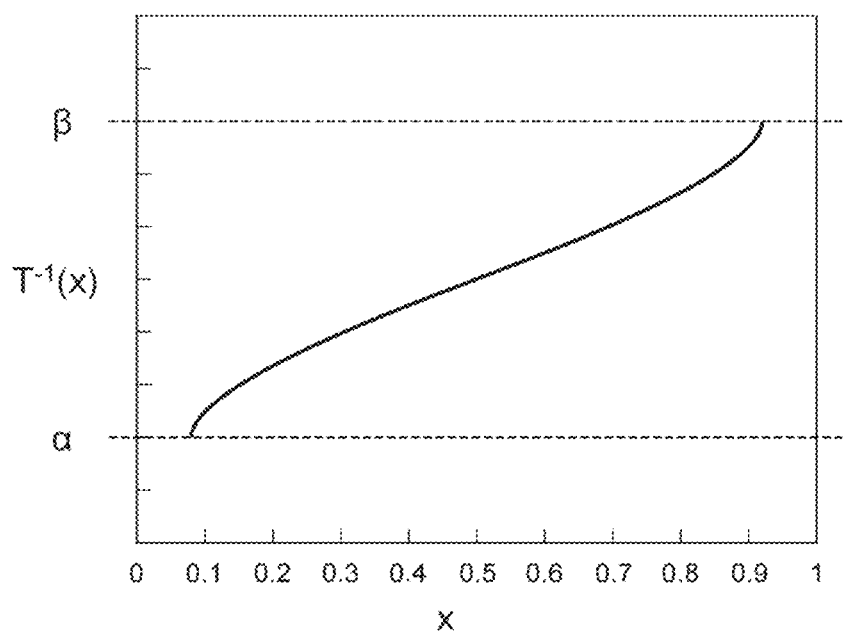

FIG. 21A Probability density function (restricted Gaussian distribution)
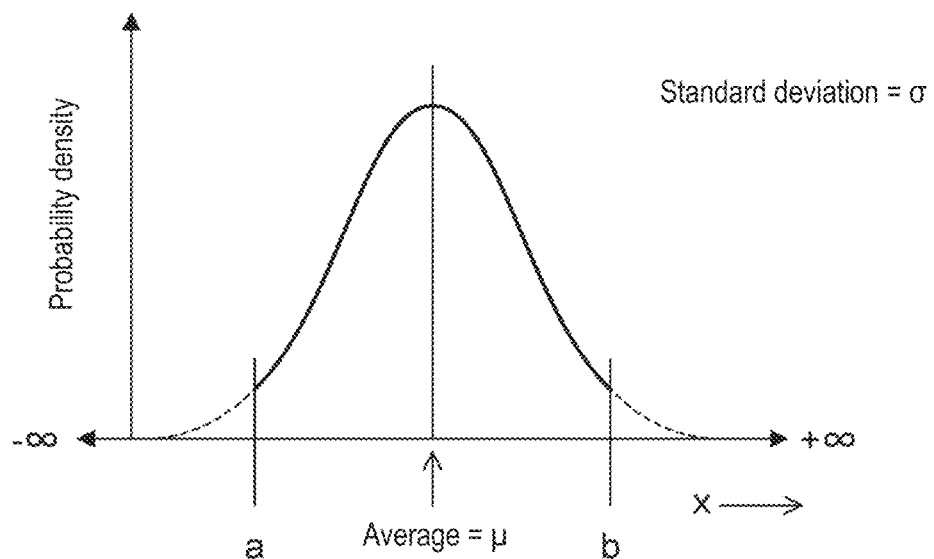
FIG. 21B
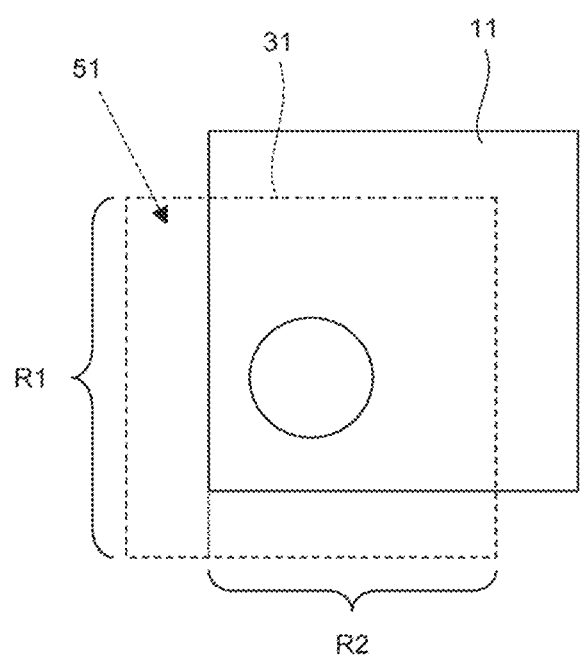

FIG. 22A Fifth embodiment
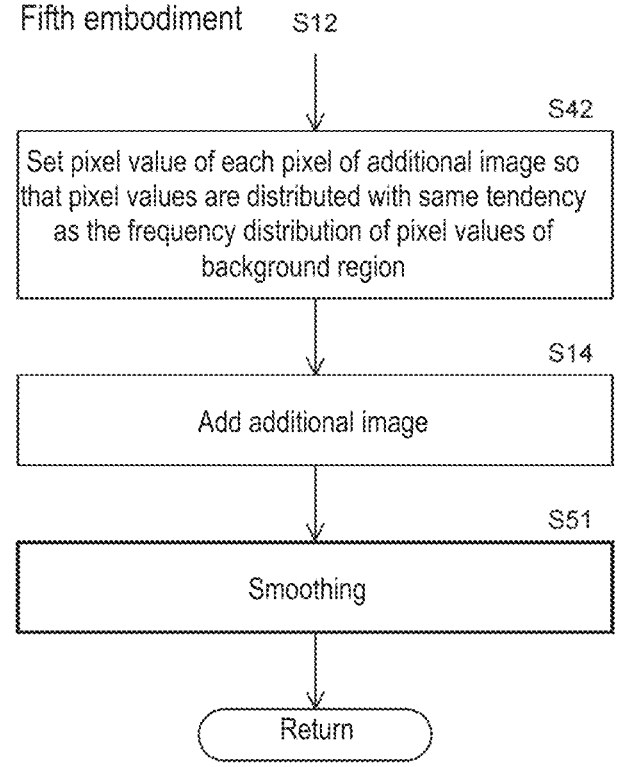
FIG. 22B
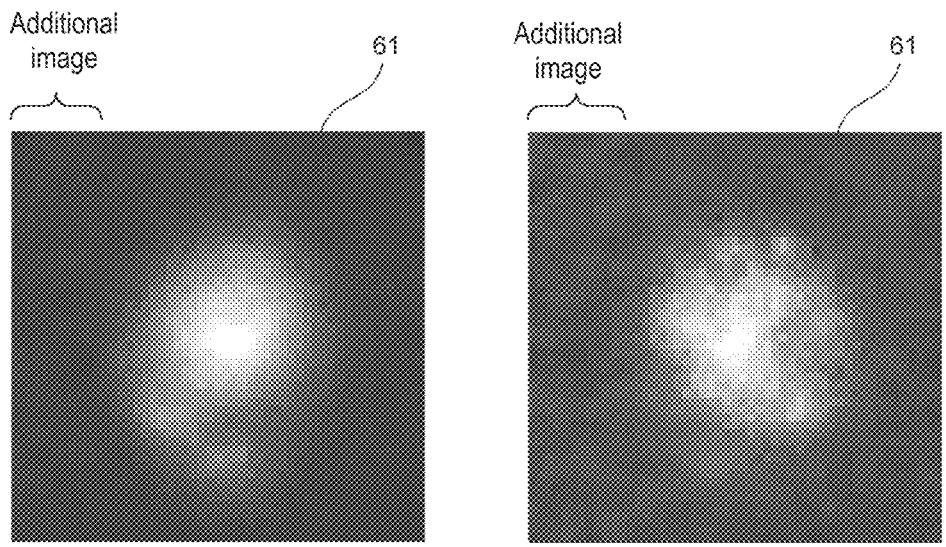

FIG. 23A Sixth embodiment
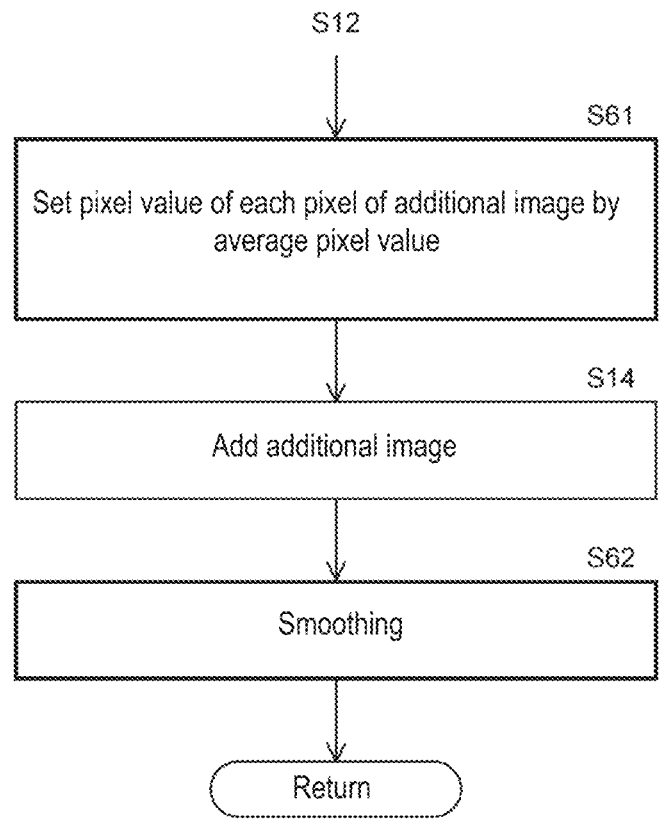
FIG. 23B
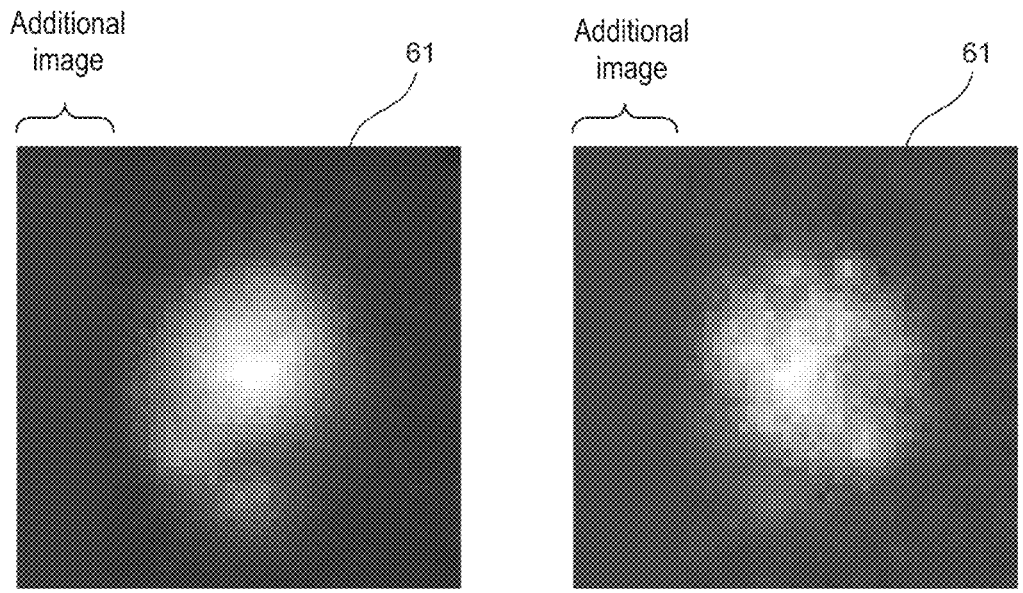

IMAGE DISPLAY APPARATUS, IMAGE DISPLAY METHOD, AND IMAGE PROCESSING METHOD

CROSS REFERENCE TO RELATED APPLICATIONS

This application claims priority from Prior Japanese Patent Application No. 2017-090460, filed on Apr. 28, 2017, entitled "IMAGE DISPLAY APPARATUS, IMAGE DISPLAY METHOD, AND IMAGE PROCESSING METHOD", the entire contents of which are incorporated herein by reference.

FIELD OF THE INVENTION

The present invention relates to an image display apparatus, an image display method, and an image processing method for imaging and displaying a test substance.

BACKGROUND

An apparatus for analyzing a test substance contained in a cell by imaging a cell and processing the captured image is used in facilities such as hospitals. This type of apparatus generally has a configuration for extracting and displaying an image including a test substance from a captured image. When examining the result of analysis by the apparatus, the operator can visually confirm the appearance state of the test substance by appropriately displaying an image including the test substance on a monitor or the like.

Japanese Patent Application Publication No. 07-286952 describes a configuration that cuts out an image of particles such as cells from a captured image to generate a display image. In this configuration, particle images 311 to 314 are displayed in the display areas 301 to 304 as shown in FIG. 24. The areas other than the images 311 to 314 of the particles in the display areas 301 to 304 are filled with white or black, or are painted out with the average density data of the background portions of the particle images 311 to 314.

SUMMARY OF THE INVENTION

The image of the particle cut out from the captured image includes the area of the particle and the background area. Among these, the background area does not become a uniform pixel value due to the characteristics of imaging, but becomes a random pixel value including undulation and a noise component. In the method of the above-mentioned Japanese Patent Application Publication No. 07-286952, the region other than the image of the particle is filled with a single color, so visibility greatly differs between this region and the background region of the particle image. For this reason, an unnatural image in which a region other than the particle image is conspicuous is displayed, and when the operator visually confirms the image, there is a possibility that operating efficiency is lowered.

In view of this problem, the invention provides an image display apparatus, an image display method, and an image processing method capable of displaying an image including a test substance as a more natural image.

A first aspect of the invention relates to an image display apparatus (120) for imaging and displaying a test substance contained in a sample (111). An image display apparatus (120) according to this aspect includes an imaging unit (200) for imaging a test substance, a processing unit 121 for adding an additional image (11c) in which the pixel value of each pixel is set so as to be distributed non-uniformly in at least a part of captured images (11 to 14) obtained by the imaging unit (200) to display images (61 to 64, and 70) for display including the regions (21 to 24), and a display unit (123) for displaying the images for display (61 to 64, and 70) generated by the image processing unit (121).

The sample is a liquid prepared based on blood, plasma, cerebrospinal fluid, interstitial fluid, urine or the like collected from a living body. The substance to be tested is a substance derived from a living body and is a specific gene in a cell, a specific substance contained in the nucleus of a cell, a specific substance in a cell membrane, a nucleus in a cell, a cell membrane, a cell, a protein or the like. The pixel value is a digital value assigned to each pixel of the image.

The pixel value of each pixel is generally nonuniform in the region other than the region of the test substance in a captured image, that is, in the background region. According to the image display apparatus of this aspect, the pixel value of each pixel of the additional image is set so that the pixel values are unevenly distributed similar to the background area of the captured image. In this way it is possible to display a natural image in which the additional image is similar to the background area of the captured image. Hence, the operator can concentrate on the region of the test substance without being distracted by the unnatural image, and can visually confirm the display image efficiently.

In the image display apparatus (120) according to this aspect, the image processing unit (121) is configured to generate a display image (61 to 64, and 70) so that the position of the region (21 to 24) of the test substance in the captured image (11 to 14) differs from the position of the test substance (21 to 24) in the display image (61 to 64, and 70).

In the image display apparatus (120) according to this aspect, the display unit (123) is configured to display a list of a plurality of display images (61 to 64, and 70) generated from the same sample (111). In this way, the operator can easily compare and contrast images for display based on the same sample.

In this case, the imaging unit (200) images a plurality of test substances of the same type, and the image processing unit (121) generates, for each of a plurality of captured images (11) obtained by the imaging unit (200) based on a plurality of test substances of the same type, display images (61 to 64, 70) for display so that the positions of the region (21) of the test substance are the same in the display images (61, 70). In this way, since the regions of the test substance are positioned at the same position in the plurality of display images to be listed, the operator can efficiently proceed with the visual confirmation of the test substance.

In this case, the image processing unit (121) is configured to generate display images (61 to 64, and 70) by respectively adding mutually different additional images (11c) corresponding to the background region other than the region (21 to 24) of the test substance to at least part of the plurality of captured images (11 to 14). In this way, a natural image in which the additional image is similar to the background region of the captured image is displayed, so that the operator can concentrate on the region of the test substance without the distraction of an unnatural image in the visual confirmation.

In the image display apparatus (120) according to this aspect, the image processing unit (121) may be configured to set the display images (61 to 64, 70) to a fixed shape and a fixed size. The display image can be made easy to see by matching the shape and size of the display image. Hence, it is possible to increase working efficiency when visually observing the state of the test substance.

In the image display apparatus (120) according to this aspect, the image processing unit (121) is configured to generate a display image (61 to 64, and 70) by adding an additional image (11c) to at least part of the captured image (11 to 14) so that the region (21) of the test substance is positioned substantially at the center of the display image (61, 70). In this way, since the region of the test substance is positioned substantially at the center of the display image, the operator can always confirm the test substance at substantially the center of the display image so that visual confirmation of the display image proceeds efficiently.

In the image display apparatus (120) according to this aspect, the image processing unit (121) is configured to acquire the average pixel value of the background region (91, 92) other than the region (21 to 24) of the test substance from the captured images, and set the pixel value of each pixel of the additional image (11c) based on the acquired average pixel value. In this way, the pixel value of the additional image can be set within the range of the pixel values close to the average pixel value of the background area. Hence, a differential of the pixel value between the background region of the captured image and the additional image can be suppressed, and a natural image in which the additional image is similar to the background area of the captured image can be displayed.

Note that the background region is not necessarily the entire region of the background area excluding the region of the test substance from the captured image, and may be a part of the background area. For example, in the case of cutting out a part of a captured image to generate a display image, the background area may be the entire region of the background area excluding the area of the test substance from the cutout image, or the region of part of the background area in the vicinity of the boundary with the additional image.

In the image display apparatus (120) according to this aspect, the image processing unit (121) is configured to acquire the average pixel value of the background region (91, 92) other than the region (21 to 24) of the test substance from the captured images, and set the pixel value of each pixel of the additional image (11c) based on the acquired average pixel value. The "average pixel value similar to the average pixel value of the background region" is, for example, the average pixel value statistically predicted in the background region. In this way, the pixel value of the additional image can be set within the range of the pixel values close to the average pixel value of the background region. Hence, a differential of pixel values between the background region of the captured image and the additional image can be suppressed, and a natural image in which the additional image is similar to the background area of the captured image can be displayed.

In the image display apparatus (120) according to this aspect, the image processing unit (121) is configured to set the pixel value of each pixel of the additional image (11c) by changing the pixel value for each pixel with respect to the average pixel value. In this way, the noise component of the pixel value occurring in the background area can be represented in the additional image. Therefore, a more natural display image can be generated.

In this case, the image processing unit (121) is configured to set the pixel value of each pixel of the additional image (11c) by adding a random number of positive or negative polarity for each pixel to the average pixel value. In this way, the noise component of the pixel value occurring in the background area can be represented in the additional image by a simple process.

The image processing unit (121) also is configured to acquire a maximum pixel value and a minimum pixel value of the background region (91, 92), and set the pixel value of each pixel of the additional image (11c) by adding a random number of either positive or negative polarity to each pixel relative to the average pixel value so that the pixel value of each pixel of the additional image (11c) is at least between the maximum pixel value and the minimum pixel value. By doing so, the noise component represented in the additional image can be rendered inconspicuous to the background region of the captured image since the pixel value of the additional image falls within the range of pixel value change of the background region of the captured image.

The image processing unit (121) also is configured to acquire a maximum pixel value and a minimum pixel value that are similar to the maximum pixel value and the minimum pixel value of the background region (91, 92), respectively, and set the pixel value of each pixel of the additional image (11c) by adding a random number of positive or negative polarity to each pixel relative to the average pixel value so that the pixel value of each pixel of the additional image (11c) falls at least between the acquired maximum pixel value and minimum pixel value. "Maximum pixel value similar to the maximum pixel value of the background region" is, for example, the maximum pixel value that is statistically predicted in the background region, and "minimum pixel value similar to the minimum pixel value of the background region" is, for example, the minimum pixel value statistically predicted in the background region. By doing so, the noise component represented in the additional image can be rendered inconspicuous to the background region of the captured image since the pixel value of the additional image falls within the range of pixel value change similar to the background region of the captured image.

In the image display apparatus (120) according to this aspect, the image processing unit (121) is configured to acquire pixel values of the background region (91, 92) other than the region (21 to 24) of the test substance in the captured image (11 to 14), and set the pixel value of each pixel of the additional image (11c) so that the pixel values of the additional image (11c) are distributed with the same tendency as the frequency distribution of the pixel values of the background region (91, 92) other than the region (21 to 24) of the test substance in the captured image (11 to 14). In this way, the noise component can be represented in the additional image with a pixel value distribution similar to the noise component of the background region. Hence, a more natural display image can be generated.

In this case, the image processing unit (121) is configured to set the pixel value of each pixel of the additional image (11c) by setting a function that defines the relationship between the random number and the pixel value based on the frequency distribution of the pixel values of the background area (91, 92), and applying a random number in the set function. In this way it is possible to smoothly calculate the pixel value of each pixel of the additional image.

In this case, the image processing unit (121) acquires the variance of the frequency distribution of the pixel values of the background region (91, 92), multiplies the inverse function of the function representing the Gaussian distribution by the acquired variance, and adds the average pixel value of the background region (91, 92) to set a function defining the relationship between the random number and the pixel value.

In the image display apparatus (120) according to this aspect, the image processing unit (121) is configured to set the pixel value of each pixel of the additional image (11c) by setting the function defining the relationship between the random number and the pixel value based on the same frequency distribution as the frequency distribution of the pixel values of the background regions (91, 92), and applying a random number to the set function. "Frequency distribution similar to the frequency distribution of pixel values in the background region" is, for example, a statistically predicted frequency distribution in the pixel value of the background region. In this way it is possible to smoothly calculate the pixel value of each pixel of the additional image.

In this case, the image processing unit (121) acquires the same variance as the variance of the frequency distribution of the pixel values of the background region (91, 92), multiplies the inverse function of the function representing the Gaussian distribution by the acquired variance, and adds the average pixel value of the background region (91, 92) to set a function defining the relationship between the random number and the pixel value. "Variance similar to the variance of the frequency distribution of pixel values in the background region" is, for example, statistically predicted variance in the frequency distribution of pixel values in the background region.

In the image display apparatus (120) according to this aspect, the image processing unit (121) is configured to set the pixel value of each pixel of the additional image (11*c*) by acquiring a maximum pixel value and a minimum pixel value of the background image (91, 92) other than the region (21 to 24) of the test substance in the captured image (11 to 14) based on a random number that varies within the range between the acquired maximum pixel value and the minimum pixel value.

In the image display apparatus (120) according to this aspect, the image processing unit (121) sets the pixel value of each pixel of the additional image (11*c*) by acquiring a maximum pixel value and minimum pixel value similar to the maximum pixel value and minimum pixel value in the background area (91, 92) other than the area (21 to 24) of the subject substance in the captured image (11 to 14), respectively, based on a random number that varies within the range between the acquired maximum pixel value and the minimum pixel value.

In the image display apparatus (120) according to this aspect, the image processing unit (121) executes a smoothing process to suppress pixel value change of pixels near the boundary between at least the additional image (11*c*) and the background areas (91, 92) of the captured image (11 to 14). In this way, continuity between the background area of the captured image and the additional image is improved, so that a more natural display image can be generated.

In the image display apparatus (120) according to this aspect, the test substance is a substance derived from a living body. By doing so, it is possible to display an image based on a substance derived from a living organism. The operator can smoothly and efficiently advance the diagnosis based on the substance derived from the living body by referring to the displayed image.

In this case, the test substance is selected from a group including a specific gene in the cell, a specific substance contained in the nucleus of the cell, a specific substance in the cell membrane, a nucleus in the cell, a cell membrane, a cell, and a protein.

In this case, the test substance contains the BCR gene and the ABL gene in the cell. In this way, images based on the BCR gene and the ABL gene can be displayed. Therefore, by referring to the displayed image, for example, the operator can confirm the translocation of these genes and a diagnosis based on these genes can proceed smoothly and efficiently.

In this case, the image processing unit (121) may be configured to superimpose an image (62) based on the BCR gene and an image (63) based on the ABL gene to generate the display image (70). The operator can easily confirm the distribution state of the BCR gene and the ABL gene by referring to the image in which the image based on the BCR gene and the image based on the ABL gene are superimposed. In this way, for example, it can be easily confirmed whether translocation occurs in these genes, and diagnosis can smoothly proceed.

In the image display apparatus (120) according to this aspect, the test substance includes a specific gene in the cell and a nucleus in the cell, and the image processing unit (121) generates a display image (70) by superimposing a nucleus-based image (61) and a gene based image (62, 63). In this way, the operator can ascertain how the gene is distributed in the nucleus. When a gene is labeled with a fluorescent dye, for example, it can be determined that the fluorescent labeling of the gene was not performed properly if light generated from the fluorescent dye that labels the gene is distributed outside the nucleus.

In the image display apparatus (120) according to this aspect, the test substance is labeled with a fluorescent dye that generates fluorescence by excitation light, and the imaging unit (200) irradiates the sample (111) containing the test substance with excitation light to capture an image of the fluorescence generated from the fluorescent dye. In this way, the region, position, and the like of the test substance can be visualized in the image by the fluorescence. Hence, the operator can confirm the state of the test substance smoothly and clearly by referring to the display image.

In this case, the imaging unit (200) includes a flow cell (210) for flowing a sample (111), light sources (221 to 223) for irradiating excitation light on the sample (111) flowing through the flow cell, and a camera (254) for imaging the sample (111) irradiated with the excitation light. In this way, a plurality of captured images based on the test substance can be continuously acquired from one sample.

A second aspect of the invention relates to an image display apparatus (120) for imaging and displaying a test substance contained in a sample (111). An image display apparatus (120) according to this aspect includes an imaging unit (200) for imaging a test substance, a processing unit (121) for adding an additional image (11*c*) in which the pixel value of each pixel is set so as to be distributed non-uniformly in at least a part of captured images (11 to 14) obtained by the imaging unit (200) to generate display images (61 to 64, and 70) including the regions (21 to 24), and a display unit (123) for displaying the display images (61 to 64, and 70) generated by the image processing unit (121).

According to the image display apparatus of this aspect, since the pixel value of each pixel of the additional image is set so that the pixel values are unevenly distributed similarly to the background area of the captured image, a natural image can be generated in which the additional image is similar to the background region of the captured image. Then, a plurality of generated images for display are displayed in a list. As a result, the operator easily concentrates on the region of the test substance without being distracted by an unnatural image while easily comparing and contrasting the display images based on the same sample, and visual confirmation of the display image proceeds efficiently.

A third aspect of the invention relates to an image display apparatus (120) for imaging and displaying a test substance contained in a sample (111). An image display apparatus (120) according to this aspect includes an imaging section (200) for imaging a test substance, an image processing unit (121) for generating display images (61 to 64, 70) including regions (21 to 24) of the test substance from the captured images (11 to 14) obtained by the imaging unit (200), and a display unit (123) for displaying the display images (61 to 64, 70) generated by the image processing unit (121). The image processing unit (121) generates a display image by acquiring a plurality of statistical values relating to pixel values of a background region (91, 92) other than the region (21 to 24) of the test substance from the captured image (11 to 14), and adding to at least a part of the captured image an additional image (11c) in which the pixel value of each pixel is set so that the pixel values are unevenly distributed.

The statistical value is, for example, an average pixel value, a maximum pixel value, a minimum pixel value, a variance of pixel values, and the like. According to the image display apparatus of this aspect, the same effects as those of the first aspect are obtained.

A fourth aspect of the invention relates to an image display method for imaging and displaying a test substance contained in a sample (111). The image display method according to this aspect includes a step (S2) of imaging a test substance, a step (S5) of generating a display image by adding an additional image (11c) in which the pixel value of each pixel is set so that the pixel values are unevenly distributed on at least a part of the captured image (11 to 14) obtained by imaging and the position of the region (21 to 24) of the test substance in the captured image (11 to 14) and the position of the region (21 to 24) of the test substance differ, and a step (S8) of displaying the generated display image (61 to 64, and 70).

According to the image display method of this aspect, the same effects as those of the first aspect are obtained.

A fifth aspect of the invention relates to an image processing method for generating a display image (61 to 64, 70) including regions (21 to 24) of a test substance from captured images (11 to 14). The image processing method according to this aspect includes a step (S5) of generating a display image (61 to 64, and 70) by adding an additional image (11c) in which the pixel value of each pixel is set so that pixel values are distributed unevenly to at least a part of the captured image (11 to 14) so that the position of the region (21 to 24) of the test substance in the captured image (11 to 14) differs from the position of the region (21 to 24) of the test substance in the display image (61 to 64, 70).

According to the image processing method of this aspect, the same effects as those of the first aspect are obtained.

According to the invention, it is possible to display a natural image in which the additional image is similar to the background region of the captured image.

BRIEF DESCRIPTION OF THE DRAWINGS

FIG. 1A is a block diagram showing a configuration of an image display apparatus and a preprocessing unit according to a first embodiment; FIGS. 1B to 1G are schematic diagrams showing a procedure for generating a display image from a captured image with respect to the nucleus according to the first embodiment;

FIG. 4A is a schematic diagram showing a captured image according to the first embodiment; FIG. 4B is a schematic diagram showing a region of a test substance according to the first embodiment; FIG. 4C is a schematic diagram showing a procedure for acquiring a region of a test substance according to the first embodiment;

FIG. 5A is a schematic diagram showing a region of a display image according to the first embodiment; FIG. 5B is a schematic diagram showing a deletion area and an additional area according to the first embodiment; FIG. 5C is a schematic diagram showing a display image according to the first embodiment;

FIG. 7A is a schematic diagram showing that a composite display image is generated by superimposing display images generated for each test substance according to the first embodiment; FIGS. 7B to 7D are schematic diagrams showing cells determined to be positive in detection of abnormal cells according to the first embodiment;

FIG. 8 is a schematic diagram showing a screen displayed on a display unit according to the first embodiment;

FIG. 10A is a schematic diagram showing an image in which a deletion image is removed from a captured image by a clipping processing according to the first embodiment; FIG. 10B is a schematic diagram showing a mask image and a background area according to the first embodiment; FIG. 10C is a schematic diagram showing a mask image and a background area according to a modification of the first embodiment;

FIG. 12A is a diagram showing a display image actually generated by the padding process of the first embodiment; FIG. 12B is a diagram showing an image actually generated by the padding process of a comparative example;

FIG. 13A is a flowchart showing a modification example of the padding process according to the first embodiment; FIG. 13B is a conceptual diagram describing the pixel value of pixels set in an additional image according to a modification example of the padding process of the first embodiment;

FIG. 14A is a flowchart showing a padding process according to a second embodiment; FIG. 14B is a conceptual diagram describing the pixel value of the pixels set in an additional image related to the padding process according to the second embodiment;

FIG. 15A is a flowchart showing a modification example of the padding process according to the second embodiment; FIG. 15B is a conceptual diagram describing the pixel value of the pixels set in an additional image according to a modification example of the padding process of the second embodiment;

FIG. 16A is a flowchart showing a padding process according to a third embodiment; FIG. 16B is a schematic diagram showing an application region of the smoothing process according to the third embodiment; FIGS. 16C to 16F are schematic diagrams describing the calculation in the smoothing process according to the third embodiment;

FIGS. 17B and 17C are schematic diagrams describing the calculation in the smoothing process according to a modification of the third embodiment;

FIG. 18A is a flowchart showing a padding process according to a fourth embodiment; FIG. 18B is a diagram showing a display image actually generated by the padding process of the fourth embodiment;

FIGS. 19A and 19B are graphs schematically showing the probability density function according to the fourth embodiment.

FIG. 20A is a graph schematically showing a cumulative distribution function according to the fourth embodiment; FIG. 20B is a graph schematically showing the inverse function of the cumulative distribution function according to the fourth embodiment;

FIG. 21A is a graph schematically showing a probability density function according to the fourth embodiment; FIG. 21B is a schematic diagram describing setting the pixel value of each pixel by dividing the additional area according to the fourth embodiment;

FIG. 22A is a flowchart showing the padding process according to a fifth embodiment; FIG. 22B is a diagram showing a display image actually generated by the padding process of the fifth embodiment;

FIG. 23A is a flowchart showing a padding process according to a sixth embodiment; FIG. 23B is a diagram showing a display image actually generated by the padding process of the sixth embodiment.

DESCRIPTION OF THE EMBODIMENTS OF THE INVENTION

Figure 2:
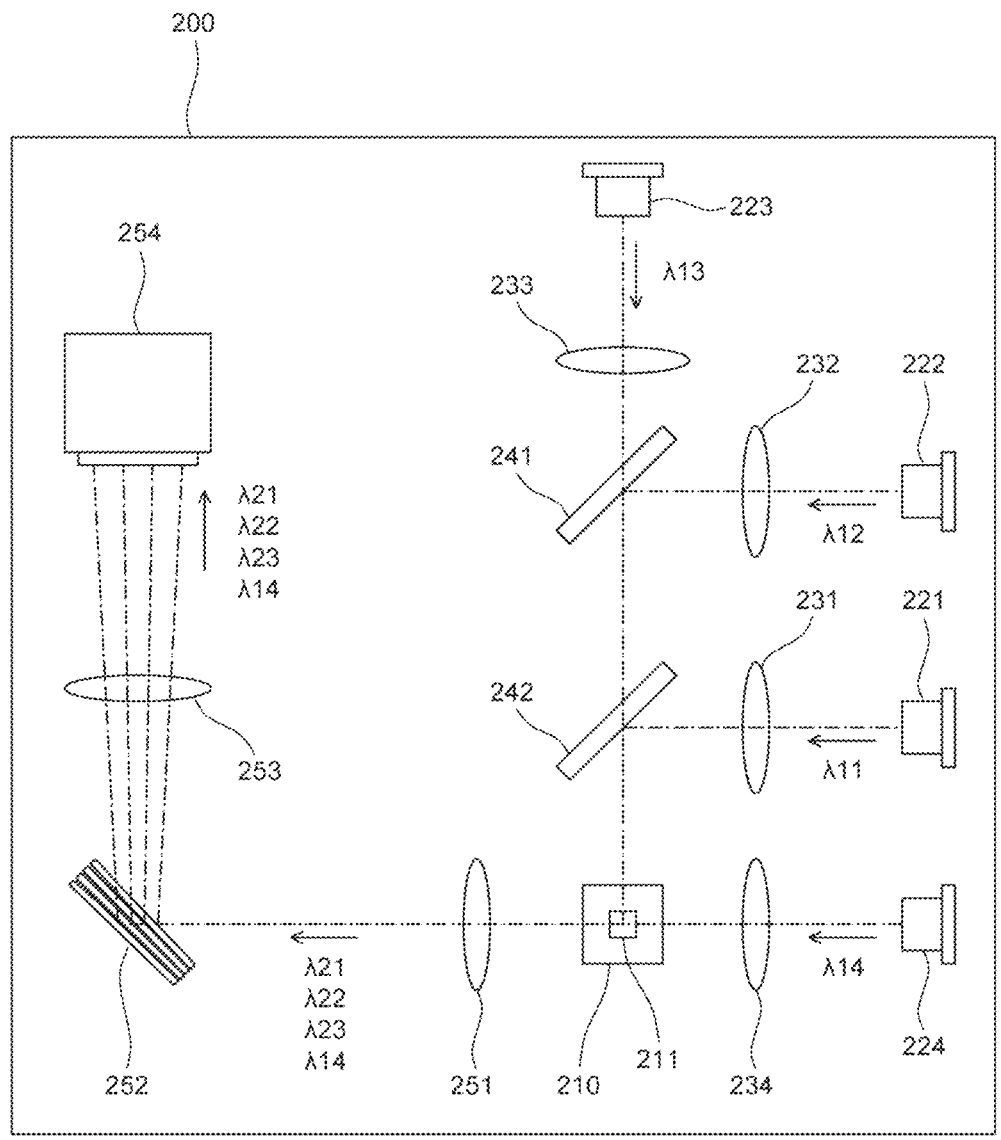
FIG. 2 is a schematic diagram showing a configuration of an imaging unit according to the first embodiment.

The following embodiments apply the invention to an image display apparatus in which a test substance contained in a sample is imaged by an imaging unit, an image processing unit generates a display image from the captured image obtained by the imaging unit, and the generated display image is displayed on a display unit. The sample is a liquid prepared based on blood collected from the living body. The test substance is the target site in the nucleic acid in a cell, the nucleus in the cell, and the cell. The target site in the nucleic acid is the BCR gene on chromosome 22 and the ABL gene on chromosome 9.

The image display apparatus described in the following embodiment also analyzes cells based on captured images. Specifically, cells having translocation between chromosome 9 and chromosome 22 found in chronic myelogenous leukemia are detected as abnormal cells. That is, in the following embodiment, cells in which the BCR gene or the ABL gene is translocated to produce the BCR-ABL fusion gene are detected as abnormal cells. In the following embodiment, the cells to be detected are white blood cells in a blood sample.

Note that the sample is not limited to a prepared liquid based on blood, and also may be a prepared liquid based on plasma, cerebrospinal fluid, interstitial fluid, urine or the like collected from a living body. The test substance also may be any substance derived from a living body, for example, a substance different from the BCR gene and the ABL gene, a specific substance contained in the nucleus of the cell, a specific substance in the cell membrane, a cell membrane, a protein.

Summary of the First Embodiment

As shown in FIG. 1A, the image display apparatus 120 measures and displays a sample 111 prepared by preprocessing performed by a preprocessing unit 110.

The operator performs processing such as centrifugal separation on a sample collected from a subject, and extracts leukocytes which are the cells to be detected. The sample is, for example, whole blood of peripheral blood. In the extraction of white blood cells, leukocytes may be extracted by hemolyzing other blood cells with a hemolytic agent instead of centrifugation. The sample containing the extracted white blood cells is set in the pretreatment unit 110.

The pretreatment unit 110 includes a mixing container for mixing the reagent and the sample, a dispensing unit for dispensing the sample and reagent to the mixing container, a heating unit for heating the mixing container and the like. The pretreatment unit 110 prepares a sample 111 from the placed sample by performing pretreatment that includes a step of labeling the target site of the cell with a fluorescent dye, and a step of specifically staining the nucleus of the cell with a fluorescent dye for nuclear staining. In the step of labeling the target site with the fluorescent dye, the nucleic acid probe labeled with the fluorescent dye and the target site in the nucleic acid are hybridized. Thus, the BCR gene, the ABL gene and the nucleus are respectively labeled with different fluorescent dyes.

The image display apparatus 120 includes an image processing unit 121, a storage unit 122, a display unit 123, an input unit 124, and an imaging unit 200. The detailed configuration of the imaging unit 200 will be described later with reference to FIG. 2. Note that the image display device 120 may be configured to include the preprocessing unit 110.

The image processing unit 121 is configured by a CPU. The image processing unit 121 may be configured by a CPU and a microcomputer. The image processing unit 121 performs various processes based on a program and data stored in the storage unit 122. The image processing unit 121 is connected to the storage unit 122, the display unit 123, the input unit 124, and the imaging unit 200, receives signals from each unit, and controls each unit. The storage unit 122 is configured by a RAM, a ROM, a hard disk, and the like. The display unit 123 is configured by a display. The input unit 124 includes a mouse and a keyboard.

The imaging unit 200 images a test substance contained in the sample 111 based on a flow cytometry method, and generates a captured image. Specifically, the imaging unit 200 captures a sample 111 flowing through the flow cell and generates a captured image of the substance to be examined for each cell. The test substance is the nucleus, the BCR gene, the ABL gene, and the whole cell as described above. For each cell, the imaging unit 200 generates fluorescence generated from a fluorescent dye that stains the nucleus, fluorescence generated from a fluorescent dye that stains the BCR gene, fluorescence generated from a fluorescent dye that stains the ABL gene, and the light transmitted through the entire cell to generate a captured image. A captured image generated by capturing light transmitted through the entire cell is a bright field image.

The image processing unit 121 processes the captured image captured by the imaging unit 200. More specifically, the image processing unit 121 generates a display image including the region of the test substance so that the position of the region of the test substance in the captured image differs from the position of the region of the test substance in the display image by adding an additional image in which pixel values of each pixel are set so that the pixel values are unevenly distributed on at least a part of the captured image.

Note that the pixel value indicates a digital value assigned to each pixel of the image. The pixel value of the first embodiment corresponds to the intensity of fluorescence generated from the fluorescent dye that stains the test substance, or the intensity of the bright field light transmitted through the cell. In a captured image based on the nucleus, BCR gene and ABL gene, the pixel value is a value obtained by converting the brightness of the fluorescence generated from the fluorescent dye that stains the nucleus, the BCR gene, and the ABL gene into digital signals. In the captured bright field image based on the cell, the brightness of the light transmitted through the cell when the light is irradiated is converted into a digital signal.

FIG. 1B to FIG. 1G are schematic diagrams showing a procedure for generating a display image from a captured image with respect to the nucleus as a test substance.

When the captured image 11 shown in FIG. 1B is acquired by the imaging unit 200, as shown in FIG. 1C, the image processing unit 121 extracts the nuclear region 21 in the captured image 11. Subsequently, the image processing unit 121 sets the area 31 of the display image 61 so that area 21 is positioned at a predetermined position of the display image 61 to be generated later. The predetermined position is, for example, substantially the center of the display image 61.

Subsequently, the image processing unit 121 removes the deletion image 11a on the outside of the area 31 in the captured image 11 from the captured image 11 as shown in FIG. 1E. In FIG. 1E, the deletion area 41 is an area corresponding to the removed deletion image 11a. An image 11b is generated by removing the deletion image 11a from the captured image 11. Subsequently, as shown in FIG. 1F, the image processing unit 121 generates an additional image 11c corresponding to the additional area 51. The additional area 51 is an area located outside the captured image 11 in the area 31. At this time, the image processing unit 121 sets the pixel value of each pixel of the additional image 11c to be unevenly distributed among the pixels. Subsequently, the image processing unit 121 combines the image 11b shown in FIG. 1E and the additional image 11c shown in FIG. 1F to generate a display image 61 shown in FIG. 1G.

When the display image 61 is generated in this way, the position of the nucleus region 21 in the captured image 11 is different from the nucleus region 21 in the display image 61. That is, the region 21 of the nucleus in the image moves from a position other than the center to substantially the center. In the examples shown in FIG. 1B to FIG. 1G, the region 21 located at the lower left in the captured image 11 moves substantially to the center in the display image 61.

The image processing unit 121 performs the procedure as shown in FIG. 1B to FIG. 1G on not only the nucleus but also other test substances, that is, the BCR gene, the ABL gene, and the cells, to create display images. Then, the image processing unit 121 displays display images based on the nucleus, the BCR gene, the ABL gene, and the cell on the display unit 123.

The pixel value of each pixel is generally nonuniform in the region other than the region of the test substance in a captured image, that is, in the background region. When the display image is generated as described above, the pixel values of each pixel of the additional image are set so that the pixel values are unevenly distributed similar to the background area of the captured image. In this way, it is possible to display a natural display image in which the additional image is similar to the background area of the captured image. Hence, the operator can concentrate on the region of the test substance without being distracted by the unnatural image, and can visually confirm the display image efficiently.

As shown in FIG. 1D, the nucleus region 21 also is positioned substantially at the center in the region 31 of the display image 61. As a result, the operator can confirm the nucleus at substantially the center of the display image 61, so that visual confirmation of the display image 61 can proceed efficiently. Note that the region of the test substance is not necessarily located at the center of the display image, and may be at the same position in the display image based on each cell. In this case, the operator also can confirm the test substance at the same position of the display image 61, so that visual confirmation of the display image can proceed efficiently.

Specific Configuration of the First Embodiment

As shown in FIG. 2, the imaging unit 200 includes a flow cell 210, light sources 221 to 224, condenser lenses 231 to 234, dichroic mirrors 241 and 242, a condenser lens 251, an optical unit 252, a condenser lens 253, and a camera 254. A sample 111 is flowed through the flow channel 211 of the flow cell 210.

The light sources 221 to 224 irradiate light on the sample 111 flowing through the flow cell 210. The light sources 221 to 224 are configured by semiconductor laser light sources. The light beams emitted from the light sources 221 to 224 are laser beams having wavelengths $\lambda 11$ to $\lambda 14$, respectively. The condensing lenses 231 to 234 collect light emitted from the light sources 221 to 224, respectively. The dichroic mirror 241 transmits light of wavelength $\lambda 13$ and reflects light of wavelength $\lambda 12$. The dichroic mirror 242 transmits the light of the wavelengths $\lambda 12$ and $\lambda 13$ and reflects the light of the wavelength $\lambda 11$. In this way, light having wavelengths $\lambda 11$ to $\lambda 14$ is irradiated on the sample 111 flowing through the flow channel 211 of the flow cell 210.

When the sample 111 flowing through the flow cell 210 is irradiated with light having wavelengths $\lambda 11$ to $\lambda 13$, fluorescence is generated from the fluorescent dyes staining the cells. That is, light of wavelengths $\lambda 11$ to $\lambda 13$ emitted from the light sources 221 to 223 are excitation light that excite fluorescence from the fluorescent dye.

Specifically, when light of wavelength $\lambda 11$ is irradiated on a fluorescent dye that stains nuclei, fluorescence of wavelength $\lambda 21$ is given off from this fluorescent dye. When the light with the wavelength $\lambda 12$ is irradiated on the fluorescent dye labeling the BCR gene, the fluorescence with the wavelength $\lambda 22$ is given off from this fluorescent dye. When the light with the wavelength $\lambda 13$ is irradiated on the fluorescent dye that labels the ABL gene, fluorescence with the wavelength $\lambda 23$ is given off from this fluorescent dye. When the sample 111 flowing through the flow cell 210 is irradiated with light having a wavelength $\lambda$ 14, this light transmits through the cell. The light having the wavelength $\lambda 14$ that has passed through the cell is used for generating a bright field captured image. In the first embodiment, the wavelength $\lambda 21$ is a wavelength band of blue light, the wavelength $\lambda 22$ is a wavelength band of green light, and the wavelength $\lambda 23$ is a wavelength band of red light.

The condenser lens 251 collects the fluorescence of the wavelengths $\lambda 21$ to $\lambda 23$ given off from the sample 111 flowing through the flow cell 210 and the light of the wavelength $\lambda 14$ transmitted through the sample 111 flowing through the flow cell 210. The optical unit 252 has a configuration in which four dichroic mirrors are combined. The four dichroic mirrors of the optical unit 252 reflect the fluorescence of the wavelengths λ21 to λ23 and the light of the wavelength λ14 at slightly different angles from each other to separate them on the light receiving surface of the camera 254. The condensing lens 253 collects the fluorescence of the wavelengths λ21 to λ23 and the light of the wavelength λ14.

The camera 254 is configured by a TDI (Time Delay Integration) camera. The camera 254 images the fluorescence of the wavelengths λ21 to λ23, and obtains three captured images which respectively correspond to the nucleus, the BCR gene, and the ABL gene. The camera 254 also images the light having the wavelength λ14 and acquires a captured image corresponding to the bright field. The camera 254 successively images the sample 111 flowing through the flow cell 210 and acquires four captured images for each cell by separating the consecutively captured images from cell to cell. The four captured images acquired for one cell are imaged with the same timing and have the same shape and the same size. The camera 254 transmits the acquired captured image to the image processing unit 121 as an imaging signal. Note that the captured image acquired by the camera 254 is a grayscale image.

In this way, when the sample 111 flowing through the flow cell 210 is imaged by the camera 254, a plurality of captured images based on the test substance can be continuously acquired from one sample 111. When the test substance is labeled with a fluorescent dye and the fluorescence given off from the fluorescent dye is captured by the camera 254, the region and the position and the like of the test substance also can be visualized in the image via the fluorescence. Hence, the operator can confirm the state of the test substance smoothly and clearly by referring to the display image. Note that the imaging unit 200 may be configured for imaging a test substance with a microscope, instead of imaging the test substance based on the flow cytometry method.

Figure 3:
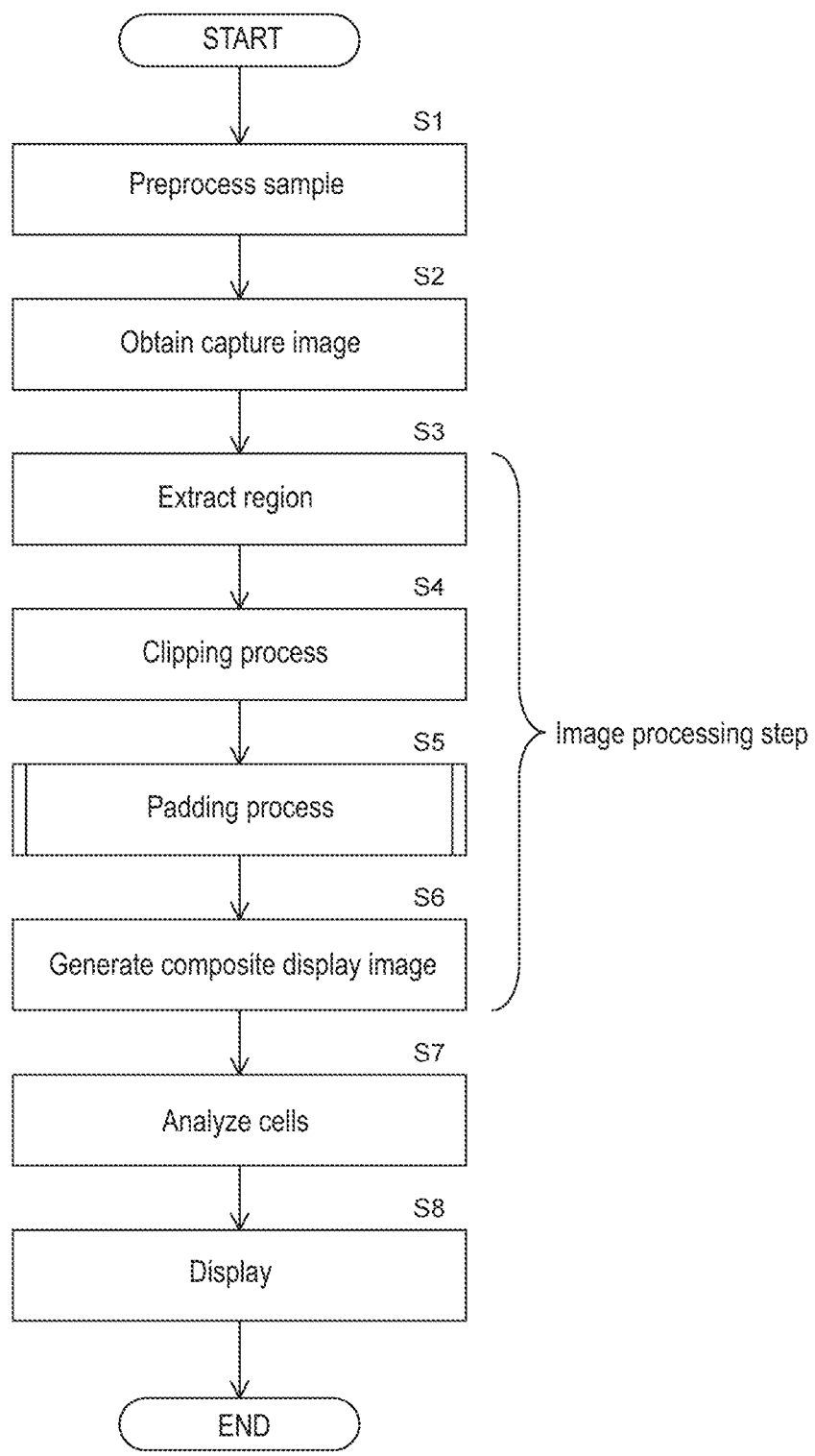
FIG. 3 is a flowchart showing processing using a preprocessing unit and an image display apparatus according to the first embodiment.

A process using the preprocessing unit 110 and the image display device 120 will be described with reference to the flowchart shown in FIG. 3. Each step of FIG. 3 will be described with reference to FIG. 4A to FIG. 8 as appropriate.

In step S1, the preprocessing unit 110 performs preprocessing on the sample. As a result, the nucleus, the BCR gene, and the ABL gene in the leukocytes, which are the ells to be detected, are fluorescently labeled to prepare the sample 111. In step S2, the image processing unit 121 controls the imaging unit 200 to obtain for each cell based on the sample 111, a captured image 11 based on the nucleus, a captured cell 12 based on the BCR gene, a captured image 13 based on the ABL gene, and a captured image 14 based on the bright field of the cell, as shown in FIG. 4A.

In step S3, the image processing unit 121 acquires regions 21 to 24 of the test substance from the captured images 11 to 14 as shown in FIG. 4B. The region 21 is a region where the nucleus is distributed in the captured image 11. The region 22 is a region in which the BCR gene is distributed in the captured image 12. The region 22 is a region in which the BCR gene is distributed in the captured image 12. The region 24 is a region in which cell is distributed in the captured image 14.

The region of the test substance in step S3 is extracted, for example, as shown in FIG. 4C. When the captured image 11 is acquired as shown at the left end of FIG. 4C, and the image processing unit 121 calculates the pixel value of the captured image 11 based on the pixel value of each pixel of the captured image 11, and creates graphs of pixel values and frequencies as shown in center of FIG. 4C. The frequency of the vertical axis indicates the number of pixels. In this graph, the image processing unit 121 sets a threshold value of a pixel value as a boundary between the region of the test substance and the background region other than a test substance, for example, based on the Otsu method. Then, the image processing unit 121 extracts a region where pixels with pixel values larger than the threshold value are distributed as the region 21 of the test substance as indicated by the broken line at the right end of FIG. 4C. Extraction of such a region of the test substance is similarly performed in the captured images 12 to 14.

In the above description, for convenience, the image processing unit 121 generates a histogram as shown in FIG. 4C, but it is not necessary to generate a histogram. The image processing unit 121 may acquire the region of the test substance by performing calculation similar to that in the case of generating the histogram.

In steps S4 and S5, the image processing unit 121 performs a clipping process and padding process. In steps S4 and S5, as shown in FIG. 5A, the image processing unit 121 sets regions 31 to 34 of the display image on the captured images 11 to 14, respectively.

Specifically, the image processing unit 121 sets the area 31 so that the center of gravity of the nucleus region 21 in the captured image 11 is positioned at the center. The region 31 is an area corresponding to the shape and size of the display image 61, and has a predetermined shape and size. The shape of the region 31 in the first embodiment is a square.

The image processing unit 121 sets the areas 32 to 34, which are entirely the same as the area 31 set for the captured image 11 of the nucleus, relative to the captured images 12 to 14, respectively. That is, the regions 32 to 34 have the same shape and the same size as those of the region 31. The position of the region 32 relative to the captured image 12, the position of the region 33 relative to the captured image 13, and the position of the region 34 relative to the captured image 14 are also the same as the position of the region 31 relative to the captured image 11. By setting the regions 31 to 34 in this way, the display images 61 to 64 and 70 to be described later have constant shapes and constant sizes between the cells.

Subsequently, as shown in FIG. 5B, the image processing unit 121 sets, as the deletion area 41, the area outside the area 31 in the captured image 11 relative to the captured image 11, and sets the area on the outer side of the captured image 11 of the region 31 is defined as an additional area 51. Similarly, the image processing unit 121 also sets the deletion areas 42 to 44 for the captured images 12 to 14, respectively, and sets the additional areas 52 to 54.

In the clipping process of step S4, the image processing unit 121 deletes the deletion image 11a located within the deletion area 41 from the captured image 11, similar to the procedure described with reference to FIGS. 1D and 1E. Then, in the padding process in step S5, the image processing unit 121 adds an additional image 11c to the added area 51 relative to the captured image 11 from which the deletion image 11a was removed as in the procedure described with reference to FIGS. 1E to 1G. The image processing unit 121 also corrects the color tone for the image based on the nucleus after the clipping process and the padding process so that the nucleus region 21 becomes blue. In this way, a display image 61 related to the nucleus is generated, as shown in FIG. 5C.

Similarly, in the clipping process of step S4, the image processing unit 121 deletes the image portions in the deletion areas 42 to 44 from the captured images 12 to 14, respectively. Then, in the padding process of step S5, the image processing unit 121 adds additional images to the additional areas 52 to 54, respectively, for the captured images 12 to 14 subjected to the padding process. The image processing unit 121 also corrects the color tone so that the region 22 of the BCR gene becomes green relative to the image based on the BCR gene for which the clipping process and the padding process have been completed. The image processing unit 121 corrects the color tone so that the area 23 of the ABL gene becomes red relative to the image based on the ABL gene for which the clipping process and the padding process have been completed. Note that the color tone is not corrected for the image based on the bright field where the clipping process and the padding process have not been completed. In this way, images for display 61 to 64 are generated, as shown in FIG. 5C.

In the padding process of step S5, similar to the case described with reference to FIG. 1F, the image processing unit 121 sets the pixel value of each pixel of the additional image so as to be unevenly distributed among the pixels. As a result, in any of the captured images 11 to 14, the additional image added in the padding process becomes an image that fits the background area of the captured images 11 to 14. Therefore, in the generated display images 61 to 64, the added additional image becomes an image familiar to the background area of the captured images 11 to 14. Details of the padding process will be described later with reference to FIG. 9.

Figure 6A:
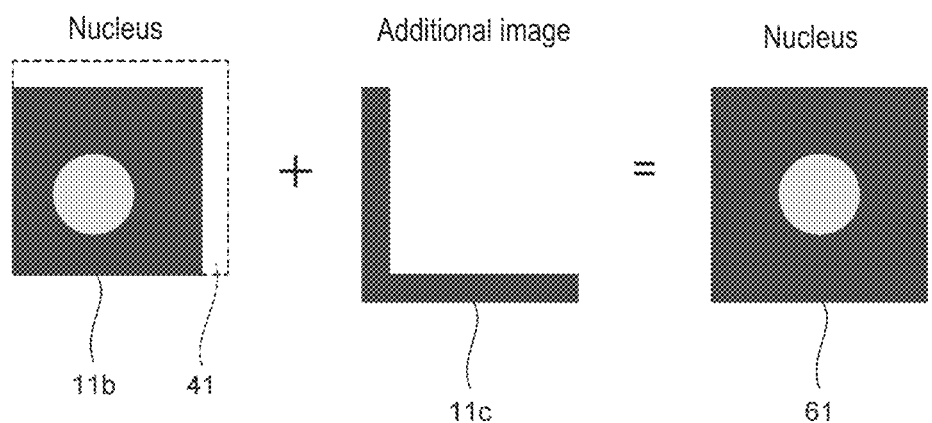
FIG. 6A is a schematic diagram showing that an additional image is added to a part of the captured image according to the first embodiment.
Figure 6B:
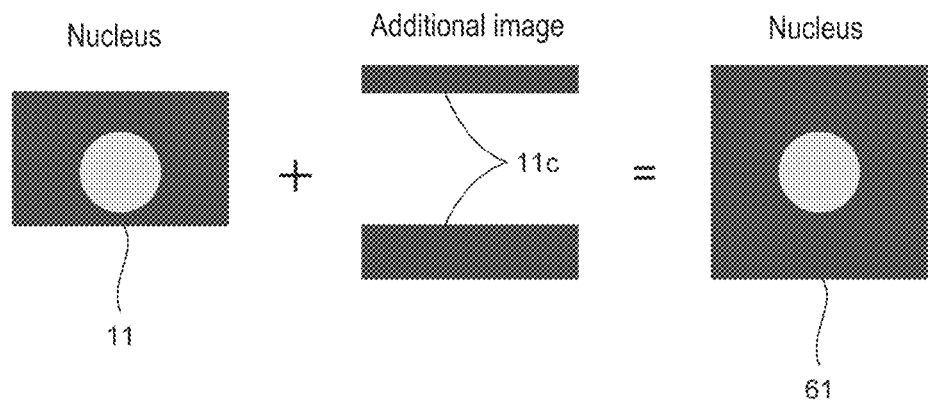
FIG. 6B is a schematic diagram showing that an additional image is added to the entire captured image according to the first embodiment.

In the examples shown in FIGS. 4A to 5C, in the padding process, an additional image is added to a captured image subjected to the clipping process, that is, a part of the captured image. For example, in the padding process on the captured image 11, as shown in FIG. 6A, an additional image 11c is added to the image 11b generated by the clipping process to generate a display image 61. However, an additional image may be added to the entire captured image without performing a clipping process on the captured image. Regarding the captured image in this case, in the padding process, an additional image 11c is added to the captured image 11 acquired by the imaging unit 200 to generate a display image 61, as shown in FIG. 6B.

Thus, depending on the shape and size of the captured image and the position of the substance to be examined, an additional image may be added to the captured image that is not subjected to the clipping process to generate a display image in some cases. That is, in the padding process, an additional image may be added to at least a part of the captured image.

Subsequently, in step S6, the image processing unit 121 generates a display image 70 by superimposing the display images 61 to 63 on each other as shown in FIG. 7A. As described above, the display images 61 to 63 are natural images in which the additional image is similar to the background area. Therefore, the background area before the addition image is added and the area of the additional image also do not look unnatural in the display image 70.

Note that in the overlaying method shown in FIG. 7A, the display images 61 to 63 were superimposed without changing the shape and size. However, the method of superimposition is not limited to the method shown in FIG. 7A if the shape and size of the generated display image 70 is the same as shown in FIG. 7A and the region of the test substance is included in the generated display image 70. For example, the display image 70 also can be generated by superposing the BCR gene region 22 of the display image 62 and the ABL gene region 23 of the display image 63 on the display image 61.

Subsequently, in step S7, the image processing unit 121 analyzes the cells. Specifically, the image processing unit 121 detects abnormal cells by determining whether the BCR gene or the ABL gene is an abnormal cell that is translocated for each cell.

For example, in the display image 70 of FIG. 7A, when two green luminescent spots and two red luminescent spots exist, the image processing unit 121 determines that the BCR gene and the ABL gene are not translocated, that is, the determination is negative. On the other hand, as shown in the schematic view of FIG. 7B, when there are two red luminescent spots, one green luminescent spot, and one yellow luminescent spot in the display image 70, the image processing unit 121 determines that translocation occurs in the BCR gene and the ABL gene, that is, the determination is positive for this cell. The reason the yellow bright spot occurs is that the green bright spot and the red bright spot are synthesized at the same position.

As shown in the schematic view of FIG. 7C, when there is one red bright spot, one green bright spot, and two yellow bright spots in the display image 70, the image processing unit 121 determines that translocation occurs in the BCR gene and the ABL gene, that is, the determination is positive for this cell. As shown in the schematic diagram of FIG. 7D, when there is one red bright spot, one green bright spot, and one yellow bright spot in the display image 70, the image processing unit 121 determines that translocation occurs for the BCR gene and ABL gene, that is, the determination is positive for this cell.

In step S7, the image processing unit 121 performs the determination of abnormal cells for each cell as described above. In the determination of abnormal cells, it is not always necessary to use the display image 70, inasmuch as the abnormal cell determination also can be made based on the distribution of the BCR gene region 22 in the display image 62 and the distribution of the ABL gene region 23 in the display image 63.

Figure 8:
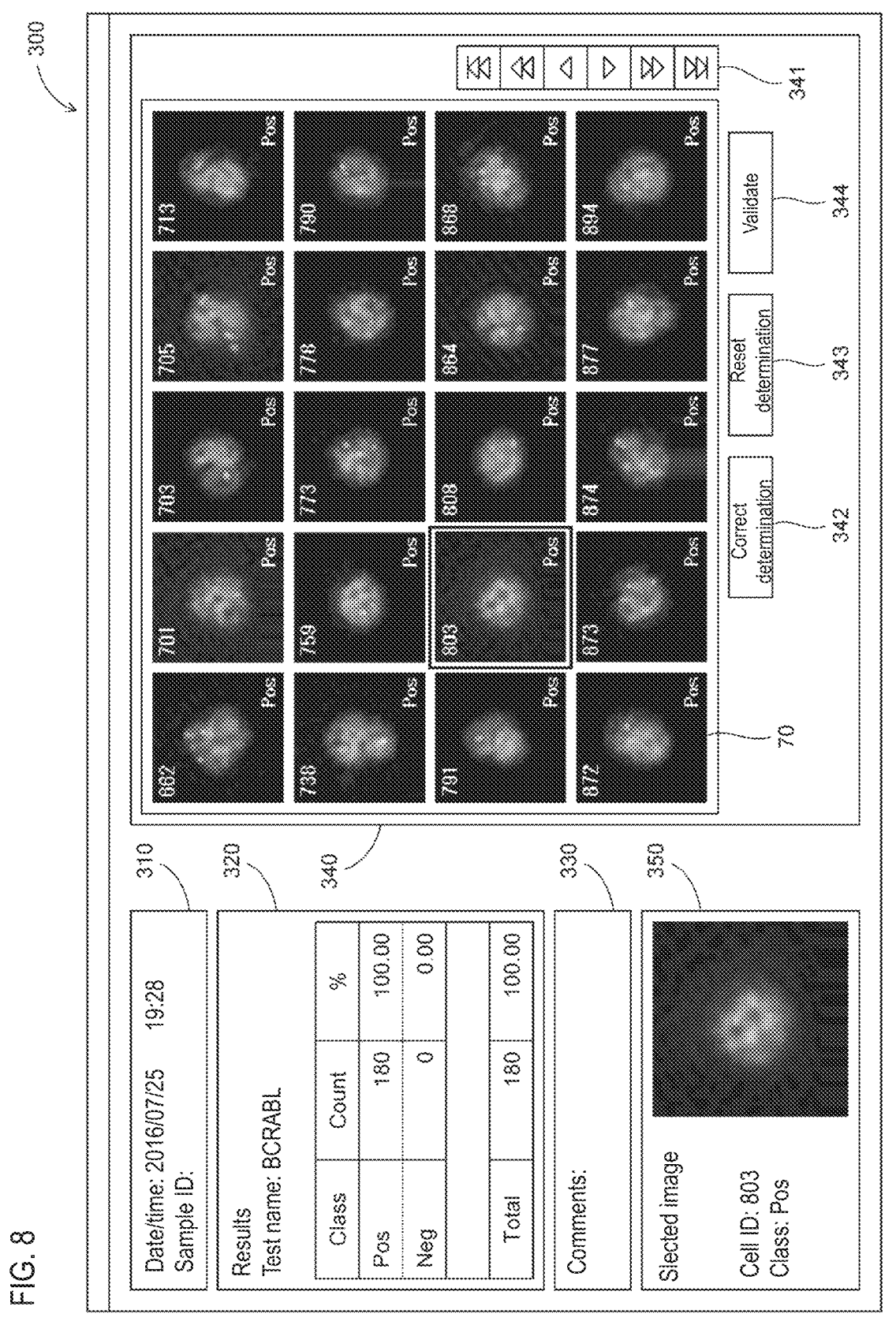

Subsequently, in step S8, the image processing unit 121 displays a screen 300 for displaying the display images 61 to 64, and 70 on the display unit 123 as shown in FIG. 8 according to the display instruction of the operator.

As shown in FIG. 8, the screen 300 includes regions 310, 320, 330, 340, and 350.

The date and time when the measurement was made and the sample ID of the sample which is the source of the information in screen 300 are displayed in region 310. The analysis result of step S7 is displayed in region 320. The number and percentage of positive cells, the number and percentage of negative cells, and the number and percentage of all cells determined positive or negative are displayed in region 320. Comments on the sample, comments on measurement and analysis and the like are displayed in region 330.

A plurality of display images 61 to 64, and 70 acquired in the image processing step are displayed in region 340. In the example shown in FIG. 8, a list of display images 70 is displayed in the area 340. Note that the display images 61 to 64 are also listed in the area 340 similar to the display image 70 by the use of a switching button or the like (not shown).

The area 340 also includes an operation unit 341 and buttons 342 to 344. The operator can scroll the display image in the area 340 and change the display image to be displayed in the area 340 by operating the operation unit 341 via the input unit 124.

The operator can change the determination result of the selected cell by selecting the display image in the area 340 via the input unit 124 and pressing a button 342. The determination results that can be changed include not only positive and negative, but also "other" which indicates that proper determination can not be made because the staining state of the cell is poor. The operator selects an image for display in the area 340 via the input unit 124 and presses the button 343 to restore the determination result on the selected cell to the determination result based on the analysis result in step S7. When the determination result is changed, the result within the area 320 is automatically corrected. An enlarged image of the display image selected within the area 340 is displayed in the region 350.

When the operator visually confirms the display image displayed in the list and determines that there is no problem in the analysis result, the operator presses a button 344 via the input unit 124 to confirm the analysis result.

As described above, the display image displayed on the screen 300 is a natural image in which the additional image is familiar to the background area. When visually confirming the image for display in this way, the operator can concentrate on the region of the test substance without being distracted by an unnatural image and efficiently perform visual confirmation of the image for display. A plurality of display images generated from the same sample 111 also are listed and displayed on the screen 300. In this way, the operator can easily compare and contrast the images for display based on the same sample 111. The display image displayed on the screen 300 also is set to have a fixed shape and a fixed size between the cells. In this way, it is possible to enhance work efficiency when observing the state of the test substance visually.

The nucleus region 21 also is positioned substantially at the center of the image for display for all cells. In this way, the operator can always check the substance to be examined at substantially the center of the display image, so that the visual confirmation of the display image can be efficiently advanced. Note that the nucleus region 21 does not necessarily have to be located at the center of the image for display and may be at the same position in the image for display of each cell. The operator also can efficiently conduct visual confirmation since the operator can confirm the test substance at the same position in this case.

A display image 62 based on the BCR gene and a display image 63 based on the ABL gene also are displayed on the screen 300. In this way, the operator can confirm the translocation of these genes, for example, with reference to the display images 62 and 63, and diagnosis based on these genes is facilitated smoothly and efficiently. A display image 70 in which a display image 62 based on the BCR gene and a display image 63 based on the ABL gene are superimposed also is displayed on the screen 300. In this way, the operator can easily confirm the distribution state of the BCR gene and the ABL gene with reference to the display image 70. Therefore, for example, it can be easily confirmed whether translocation has occurred in these genes, and the diagnosis can proceed smoothly.

The display image 70 displayed on the screen 300 also is generated by overlapping the display image 61 based on the nucleus and the display images 62 and 63 based on the genes. In this way the operator can ascertain how the gene is distributed in the nucleus. For example, if light generated from a fluorescent dye that labels a gene is distributed outside the nucleus, it can be determined that the fluorescent labeling of the gene was not performed properly.

First Embodiment Padding Process

A padding process according to the first embodiment will be described with reference to FIG. 9. Note that since the padding process for the captured images 11 to 14 that have been subjected to the clipping process is the same in each instance, only the case of the captured image 11 based on the nucleus will be described in the following description for convenience. Hereinafter, each step of FIG. 9 will be described with reference to FIGS. 10A to 11A as appropriate.

As shown in FIG. 10A, in the clipping process performed before the padding process, the deleted image 11a is removed from the captured image 11, so that the image 11b is generated as described above. When the padding process is started, in step S11, the image processing unit 121 reads the pixel value of each pixel in the background region 91 other than the nucleus area 21 in the image 11b. The background region 91 is a hatched area in FIG. 10B.

Here, in order to recognize the background region 91 of the image 11b, the image processing unit 121 uses a mask image 91a based on the image 11b and the nucleus region 21 as shown in FIG. 10B. The mask image 91a is an image having the same shape and size as the image 11b and pixels in a region other than the nucleus region 21 are set to black. In step S11, the image processing unit 121 identifies the portion of the image 11b at the position of the black pixels of the mask image 91a as the background region 91 of the image 11b by applying the mask image 91a to the image 11b. Then, the image processing unit 121 reads the pixel value of each pixel in the background region 91 of the image 11b.

Note that although the background area to be processed in step S11 is the background region 91 other than the region 21 of the image 11b, the present invention is not limited to this arrangement inasmuch as another background region 92 other than the region 21 of the captured image 11 also may be specified, as shown in FIG. 10C. In this case, the image processing unit 121 identifies the background region 92 of the captured image 11 by applying the mask image 92a to the captured image 11. The background region to be targeted in step S11 also may be a partial area in the vicinity of the background region 91 to which the additional image 11c is added.

Subsequently, in step S12, the image processing unit 121 acquires background information based on the pixel value of the background region 91 read in step S11. In the padding process according to the first embodiment, the background information is an average value of the pixel value of each pixel in the background region 91 of the image 11b, that is, an average pixel value.

Subsequently, in step S13, the image processing unit 121 adds a random number of positive or negative polarity for each pixel to the average pixel value, thereby setting the pixel value of each pixel of the additional image 11c. At this time, the image processing unit 121 sets the pixel value of each pixel of the additional image 11c by changing the pixel value for each pixel relative to the average pixel value.

Figure 11A:
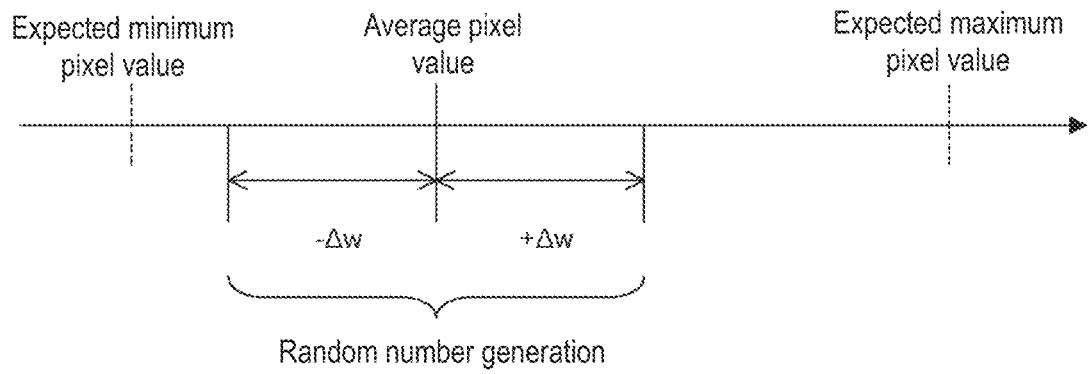
FIG. 11A is a conceptual diagram describing the pixel value of pixels set in an additional image according to the first embodiment.

As shown in FIG. 11A, in step S13, a random number generated in a range from −Δw to +Δw is added to the average pixel value. In this case, a range of the random number set in advance to be small is stored in the storage unit 122 so that the value obtained by adding the random number to the average pixel value falls between the expected minimum pixel value and the expected maximum pixel value. The expected minimum pixel value is the minimum pixel value that is statistically expected in the background region 91, and the expected maximum pixel value is the maximum pixel value that is statistically expected in the background region 91.

Then, in step S14, the image processing unit 121 adds the additional image 11c in which the pixel value is set in step S13 to the image 11b to generate the display image 61.

Figure 11B:
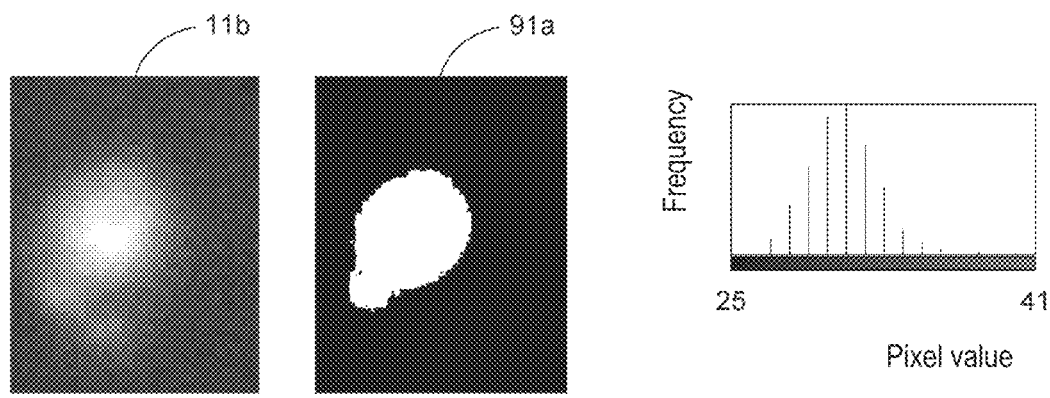
FIGS. 11B and 11C are diagrams showing images, mask images, and histograms post-clipping actually generated according to the first embodiment.
Figure 11C:
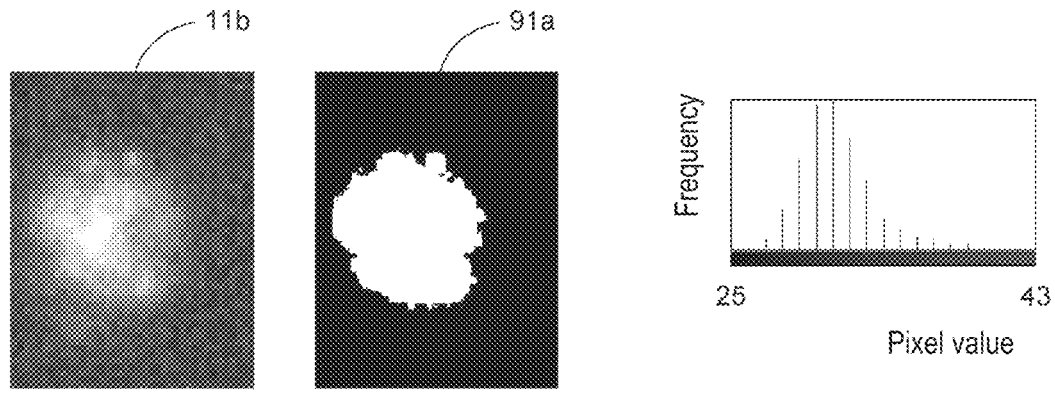

In the histogram shown in FIG. 11B, the background region 91 in the image 11b is identified by applying the corresponding mask image 91a in FIG. 11B to the image 11b in FIG. 11B, and the identified background region 91 on the basis of the pixel value of each pixel. Similarly, the histogram shown in FIG. 11C is created based on the pixel value of each pixel of the identified background region 91 when the background region 91 in the image 11b is identified by applying the corresponding mask image 91a in FIG. 11C to the image 11b in FIG. 11C. The pixel value of each pixel of the image 11b in FIGS. 11B and 11C are represented by 256 gradations from 0 to 255. The horizontal axis and the vertical axis of the histogram of FIGS. 11B and 11C respectively indicate the pixel value and the frequency. In any of the histograms of FIGS. 11B and 11C, the pixel values of the background region 91 are distributed in a peaked shape at the low value.

According to the padding process of the first embodiment, a random number generated in the range from −Δw to +Δw is added to the average pixel value acquired from the background region 91 as shown in FIG. 11A. Therefore, the pixel value of the additional image 11c can be set within the pixel value range close to the average pixel value of the background region 91. Hence, the difference in pixel value between the background region 91 and the additional image 11c of the image 11b can be suppressed, and a natural image can be generated in which the additional image 11c is similar to the background region 91 of the image 11b.

As described above, the pixel value of each pixel of the additional image 11c is set by adding a random number of positive or negative polarity for each pixel to the average pixel value. By such a simple process, the noise component of the pixel value occurring in the background region 91 can be expressed in the additional image 11c. The pixel value of each pixel of the additional image 11c also is set so that the pixel value changes on the basis of the random number for each pixel relative to the average pixel value. In this way, the noise component of the pixel value occurring in the background region 91 can be expressed in the additional image 11c, and a more natural display image 61 can be generated.

Such a padding process is performed on the captured image 11 obtained for each cell. In this way, the additional images 11c set according to the captured image 11 are mutually different from each other according to the background region 91 of each captured image 11. Therefore, since the display image 61 for each cell is a natural image similar to the additional image 11c, the operator can concentrate on the region of the test substance without being distracted by unnatural images in visual confirmation.

FIG. 12A is a diagram showing the display image 61 actually generated from the image 11b shown in FIGS. 11B and 11C by the padding process of the first embodiment. In this case, it can be seen that the noise component of the pixel values occurring in the background region is expressed in the additional image. On the other hand, FIG. 12B is a diagram showing a display image actually generated from the image 11b shown in FIGS. 11B and 11C by the padding process of a comparative example. In the padding process of the comparative example, the region corresponding to the additional image is filled with the average pixel value of the background region 91. Comparing FIG. 12A and FIG. 12B, the display image 61 generated by the padding process of the first embodiment is a natural image in which the additional image 11c is similar to the image 11b of the background region 91.

Modification Example of Padding Process of First Embodiment

Figure 9:
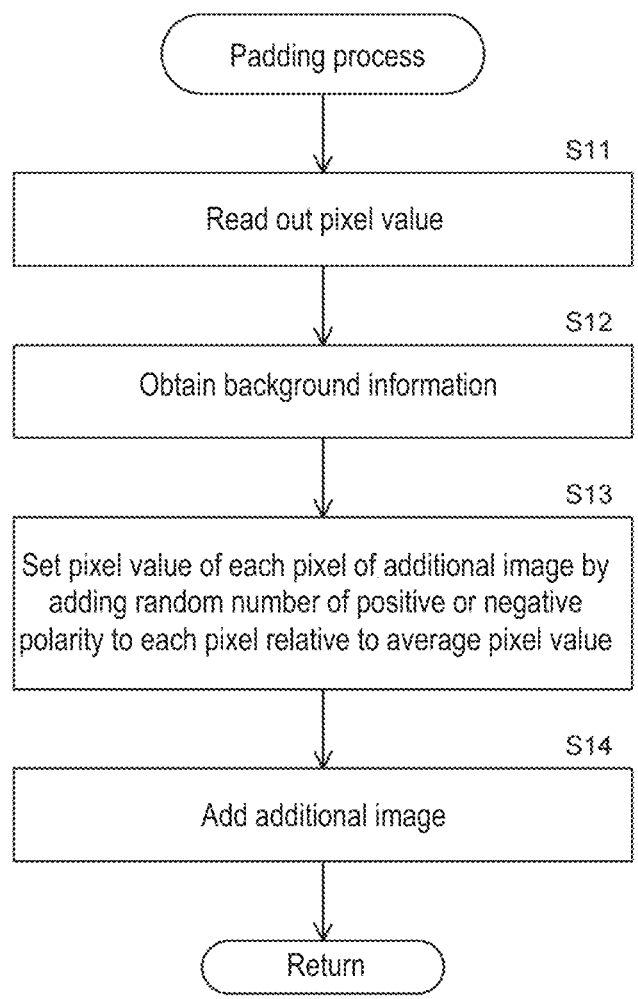
FIG. 9 is a flowchart showing a padding process according to the first embodiment.

As shown in FIG. 13A, in the modification example of the padding process of the first embodiment, steps S15 and S16 are added instead of step S12 as compared with the padding process of the first embodiment shown in FIG. 9. Steps different from the padding process of the first embodiment will be described below.

In step S15, the image processing unit 121 acquires the maximum pixel value and the minimum pixel value of the pixels in the background region 91 of the image 11b in addition to the average pixel value similar to the padding process of the embodiment as the background information. Then, in step S16, the image processing unit 121 sets the range of random numbers so that the value obtained by adding the random number value to the average pixel value is included between the maximum pixel value and the minimum pixel value as shown in FIG. 13B. In step S13, similarly to the padding process of the first embodiment, the image processing unit 121 sets the pixel value of each pixel of the additional image 11c by adding a random number of positive or negative polarity for each pixel to the average pixel value.

When the pixel value of each pixel of the additional image 11c is set in this way, the noise component expressed in the additional image 11c becomes less conspicuous to the background region 91 because the pixel value of the additional image 11c always fits within the pixel value change range of the background region 91 of the image 11b.

Second Embodiment

The second embodiment differs from the first embodiment only in the padding process. As shown in FIG. 14A, the padding process of the second embodiment is different from the padding process of the first embodiment shown in FIG. 9 in that step S21 is added instead of step S12, and step S22 is added instead of step S13. Steps different from the padding process of the first embodiment will be described below.

In step S21, the image processing unit 121 acquires the maximum pixel value and the minimum pixel value of the pixels in the background region 91 of the image 11b as background information. Then, in step S22, the image processing unit 121 sets the pixel value of each pixel of the additional image 11c with a random number that changes between the maximum pixel value and the minimum pixel value as shown in FIG. 14B.

When the pixel value of each pixel of the additional image 11c is set in this way, the noise component expressed in the additional image 11c becomes less conspicuous to the background region 91 because the pixel value of the additional image 11c always fits within the pixel value change range of the background region 91 of the image 11. In this case, however, since the pixel value of the additional image 11c is evenly distributed between the maximum pixel value and the minimum pixel value, as shown in the histograms of FIGS. 11B and 11C, the distribution of the pixel values of the background region 91 is somewhat different. Therefore, as in the padding process of the first embodiment, it is preferable that a random number is added with the average pixel value as the center.

Steps S11 and S21 are omitted, and in step S22, the expected maximum pixel value and expected minimum pixel value previously stored in the storage unit 122 also may be used instead of the maximum pixel value and the minimum pixel value acquired from the background region 91 of the image 11b. In this case, although there is a possibility that the pixel value set by the random number may be smaller than the actual minimum pixel value or may be larger than the actual maximum pixel value, the noise component expressed in the additional image 11c becomes less conspicuous relative to the background region 91 of the captured image 11.

Modification Example of Padding Process of the Second Embodiment

In the modification example of the padding process of the second embodiment, steps S11 and S21 shown in FIG. 15A are omitted and step S23 is added instead of the step S22 as shown in FIG. 15A as compared with the padding process of the second embodiment shown in FIG. 14A. Steps different from the padding processing of the second embodiment will be described below.

In step S23, the image processing unit 121 sets the pixel value of each pixel of the additional image 11c by adding a random number of positive or negative polarity to each pixel relative to the expected average pixel value, as shown in FIG. 15B. The expected average pixel value is a statistically predicted pixel value as an average value of each pixel in the background region 91 of the image 11b. The expected average pixel value is stored in the storage unit 122 in advance. Also in this case, the range of the random numbers set to be small in advance is stored in the storage unit 122 so that the value of the random number added to the expected average pixel value falls between the expected maximum pixel value and the expected minimum pixel value.

When the pixel value of each pixel of the additional image 11c is set in this way, the pixel values of the additional image 11c can be set within the pixel value range near to the average pixel value similar to the background region 91. Therefore, it is possible to suppress the difference in pixel value between the background region 91 and the additional image 11c of the image 11b, and to display a natural image in which the additional image 11c is similar to the background region 91 of the image 11b. In this case, it also is not necessary to acquire background information, so the processing steps can be simplified. However, in this case, the average pixel value obtained from the background region 91 of the image 11b is preferably used when setting the pixel value of the additional image 11c, since the expected average pixel value may be greatly different from the average pixel value of the actual background region 91.

Third Embodiment

The third embodiment differs from the first embodiment only in the padding process. As shown in FIG. 16A, the padding process according to the third embodiment is different from the padding process of the first embodiment shown in FIG. 9 in that step S31 is added following step S14. Steps different from the padding process of the first embodiment will be described below.

In step S14, an additional image 11c is added to the image 11b to generate a display image 61. In step S31, the image processing unit 121 performs a smoothing process on the display image 61 to suppress pixel value change. As shown in FIG. 16B, the smoothing process application region is a region obtained by removing the nucleus region 21 of the test substance from the entire region of the display image 61. Note that the smoothing process application region may be set to include at least the vicinity of the boundary between the additional image 11c and the background region 91 of the captured image 11.

As shown in FIG. 16C, when the pixel value of the target pixel is Vx and the pixel values of the eight pixels around the target pixel are V1 to V8, the image processing unit 121 calculates Vx=(V1+V2+ . . . +V8)/8 in the smoothing process. In step S31, the image processing unit 121 shifts the target pixel sequentially in the smoothing process application region and performs the above calculation, then sets the pixel value of the target pixel to Vx. When calculation of pixel values is performed once for all the pixels in the smoothing process application region, the smoothing process is terminated.

As shown in FIGS. 16D and 16E, when the target pixel is located at the end of the smoothing process application region, the pixel value of the pixel outside the smoothing process application region is designated the pixel value of the pixel at the symmetric position inside the smoothing process application region. Therefore, the pixel value Vx of the target pixel is acquired by calculation of Vx=(2 V 2+4 V 3+2 V 5)/8 in the case of FIG. 16D, and acquired by Vx=(2 V 1+2V2+2V3+V 4+V 5)/8 in the case of FIG. 16E. As shown in FIG. 16F, the calculation of pixel value Vx of the target pixel can be obtained by calculation similar to FIG. 16C without the relationship between the additional image 11c and image 11b as long as the pixel value Vx of the target pixel is within the smoothing process application region.

Figure 17A:
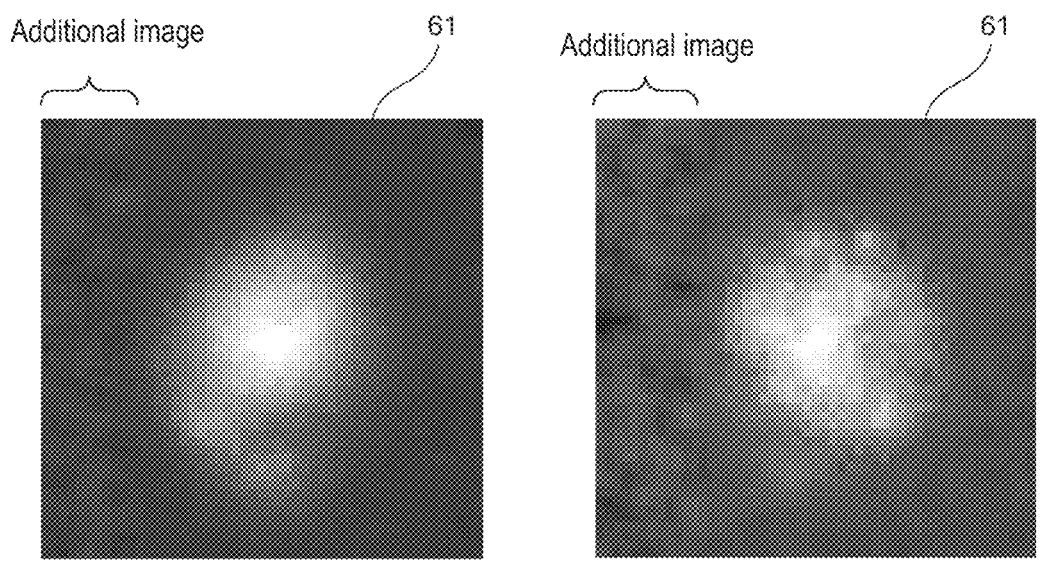
FIG. 17A is a diagram showing a display image actually generated by the padding process of the third embodiment.
Figure 24:
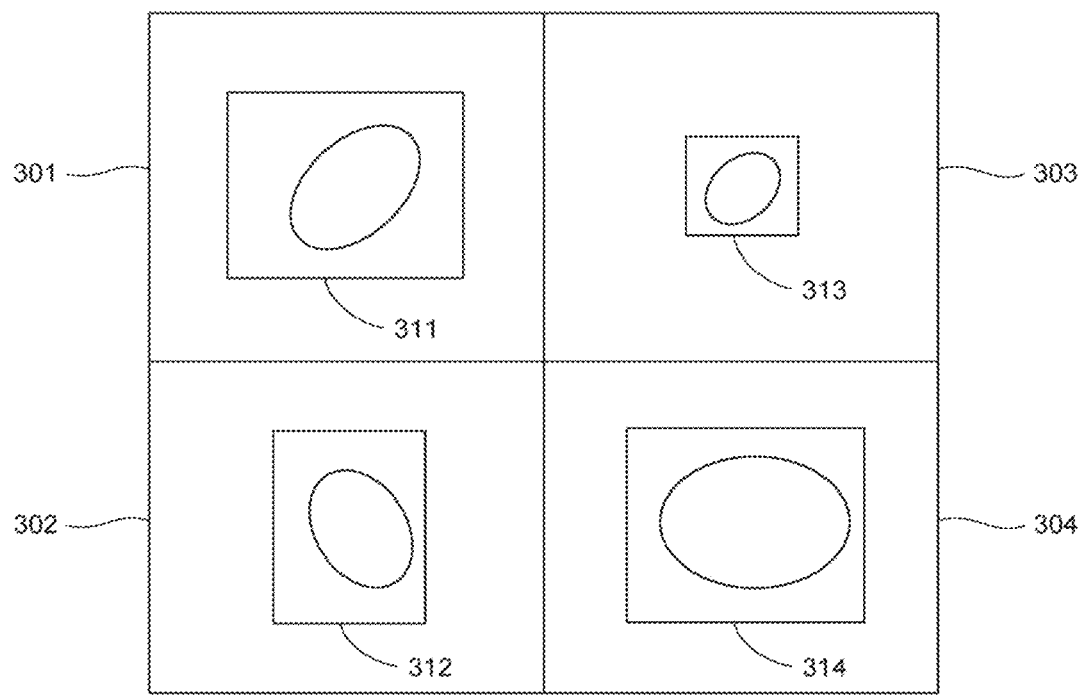
FIG. 24 is a schematic diagram describing a configuration of the related art.

FIG. 17A is a diagram showing a display image 61 in which the smoothing process is actually performed by the padding process of the third embodiment. The display image 61 in FIG. 17A is generated by performing the smoothing process described in step S31 of FIG. 16A on the display image 61 shown in FIG. 12A. When referencing a region other than the nucleus region 21 of the display image 61, although the pixel values of the adjacent pixels are opened in the case of FIG. 12A, the pixel values of the adjacent pixels are brought closer in the case of FIG. 17A to obtain a pattern of pixel values that is smooth overall in a region other than the region 21 of the nucleus.

According to the padding process of the third embodiment, since the smoothing process is executed on at least the pixels in the vicinity of the boundary between the additional image 11c and the background region 91 of the image 11b, the continuity if improved between the additional image 11c and the background region 91 of the image 11b, thus generating a more natural display image 61. Since the smoothing process according to the third embodiment is performed on the entire region other than the nucleus region 21, it also is possible to suppress a sense of incompatibility in the entire background portion.

In the smoothing process according to the third embodiment, the pixel value Vx of the target pixel also may be set by performing the calculation of Vx=(V 1+V 2+V 3+V 4)/4 (4) based on the pixel values of the four surrounding pixels of the target pixel, as shown in FIG. 17B, as shown in FIG. 17B. As shown in FIG. 17C, the pixel value Vx of the target pixel also may be set by performing the calculation of Vx=(V1+V2+ . . . +V24)/24 based on the pixel values of the 24 pixels around the target pixel. In this way, the number of surrounding pixels used for setting the pixel value Vx of the target pixel is not limited to the eight pixels in FIG. 16C. In the smoothing process, the number of times to calculate the pixel values for all the pixels in the application region of the smoothing process is not limited to once inasmuch as the calculation may be performed a plurality of times.

Fourth Embodiment

The fourth embodiment differs from the first embodiment only in the padding process. As shown in FIG. 18A, the padding process of the fourth embodiment is different from the padding process of the first embodiment shown in FIG. 9 in that step S41 is added instead of step S12, and step S42 is added instead of step S13. Steps different from the padding process of the first embodiment will be described below.

In step S41, the image processing unit 121 acquires the average pixel value, the maximum pixel value, the minimum pixel value, and the standard deviation of the pixels of the image 11b in the background region 91 as background information. Then, in step S42, the image processing unit 121 sets the pixel value of each pixel of the additional image 11c based on the background information, so that the pixel values of the additional image 11c are distributed with the same tendency as the frequency distribution of the pixel values of the background region 91.

FIG. 18B is a diagram showing the display image 61 actually generated from the image 11b shown in FIG. 11B and FIG. 11C by the padding processing of the fourth embodiment. In the case of FIG. 18B, it can be seen that the pixel value of each pixel expressed in the additional image 11c is closer to the noise component of the pixel value generated in the background region 91 of the image 11b as compared with the first embodiment shown in FIG. 12A. As described above, according to the padding process of the fourth embodiment, a more natural display image 61 can be generated since the noise component can be expressed in the additional image 11c with a pixel value distribution similar to the noise component occurring in the background area 91.

Here, the arithmetic expression used in step S42 will be described in detail.

The frequency distribution of the pixel values of the background region 91 has the same distribution as the Gaussian distribution. In step S42, the pixel value of each pixel of the additional image 11c is set based on the function defining the Gaussian distribution, the average pixel value of the background region, the maximum pixel value, the minimum pixel value, the standard deviation of the pixel value, and a random number equally distributed in a predetermined range. Specifically, the pixel value of each pixel of the additional image 11c is set according to the following expression (1).

$$Z=F^{-1}(F(\alpha)+U\cdot(F(\beta)-F(\alpha))\cdot\sigma+\mu \quad (1)$$

Where $\alpha$ and $\beta$ in expression (1) are given by the following expressions (2) and (3).

$$\alpha=(a-\mu)/\sigma \quad (2)$$

$$\beta=(b-\mu)/\sigma \quad (3)$$

The parameters of the expressions (1) to (3) are as follows.
Z: Pixel value of each pixel.
F: Cumulative distribution function of standard Gaussian distribution ($\mu=0$, $\sigma=1$).
$F^{-1}$: Inverse function of cumulative distribution function F.
U: Random number occurring equally in the range of 0 to 1.

$\mu$: Average pixel value of background area.
$\sigma$: Standard deviation of the pixel value of the background region.
a: Minimum pixel value of the background region.
b: maximum pixel value of the background area.

The cumulative distribution function F (t) is given by the following expression (4).

$$F(t) = \frac{1}{2}\left(1 + \operatorname{erf}\left(\frac{t}{\sqrt{2}}\right)\right) \quad (4)$$

The derivation process of expression (1) is described below.

FIG. 19A shows the probability density function f(x) of the standard Gaussian distribution ($\mu=0$, $\sigma=1$). The probability density function f(x) is given by the following equation (5).

$$f(x) = \frac{1}{\sqrt{2\pi}} e^{\frac{-x^2}{2}} \quad (5)$$

FIG. 19B shows the probability density function t(x) of the restricted Gaussian distribution in which the standard Gaussian distribution is limited to the range of values $\alpha$ to $\beta$ on the horizontal axis. When the value on the horizontal axis is outside the range of values $\alpha$ to $\beta$, the value of the probability density function t(x) is zero. Here, the probability density function t(x) is given by the following expression (6).

$$t(x)=f(x)/(F(\beta)-F(\alpha)) \quad (6)$$

FIG. 20A shows the cumulative distribution function T(x) of the restricted Gaussian distribution ($\mu=0$, $\sigma=1$, $\alpha \le x \le \beta$) shown in FIG. 19B. The cumulative distribution function T(x) is given by the following expression (7).

$$T(x)=(F(x)-F(\alpha))/(F(\beta)-F(\alpha)) \quad (7)$$

FIG. 20B shows the inverse function $T(x)^{-1}(x)$ of the cumulative distribution function T(x) shown in the expression (7). Inverse function $T^{-1}(x)$ is given by the following expression (8).

$$T^{-1}(x)=F^{-1}(F(\alpha)+x\cdot(F(\beta)-F(\alpha))) \quad (8)$$

Here, according to the inverse transformation method, when the variable x is a random number uniformly occurring in the range of 0 to 1, $T^{-1}(x)$ is randomly distributed in the frequency distribution of the restricted Gaussian distribution shown in FIG. 19B. Therefore, values can be generated to be distributed in the frequency distribution shown in FIG. 21A by multiplying the value of $T^{-1}$ by the standard deviation $\sigma$ and adding the average pixel value $\mu$ to derive the following equation (9).

$$Z=T^{-1}(U)\cdot\sigma+\mu \quad (9)$$

Here, U is a random number equally occurring in the range of 0 to 1 similar to the variable x.

Expression (1) above is obtained by substituting expression (8) into expression (9). Therefore, after applying the standard deviation of the average pixel value, the maximum pixel value, the minimum pixel value, and the pixel value acquired from the background region 91 to expression (1), the pixel values of the additional image 11c are distributed with a tendency similar to the frequency distribution of the background region 91 by substituting the random number U for each pixel of the additional image 11*c*, and setting the pixel value.

Note that in the case where an additional region 51 is set as shown in FIG. 21B, the additional region 51 may be divided into a region R1 and a region R2, and pixel values for each pixel may be individually set for the regions R1 and R2, or the pixel value for each pixel may be set for the entire additional region 51.

Although the average pixel value, the maximum pixel value, the minimum pixel value, and the standard deviation are acquired from the background region 91 of the image 11*b* in step S41, alternatively the statistically expected average pixel value, the maximum pixel value, the minimum pixel value, and the standard deviation also may be read in advance from storage unit 122 similar to each value of the background region 91 of the image 11*b*. In this case, on the basis of each read value, the pixel value of each pixel of the additional image 11*c* is set in step S42.

Fifth Embodiment

The fifth embodiment differs from the fourth embodiment only in the padding process. As shown in FIG. 22A, the padding process according to the fifth embodiment differs from the padding process of the fourth embodiment shown in FIG. 18A in that step S51 is added to the latter stage of step S14. Hereinafter, steps different from the padding processing of the fourth embodiment will be described.

In step S14, an additional image 11*c* is added to the image 11*b* to generate a display image 61. In step S51, the image processing unit 121 performs a smoothing process on the display image 61 to suppress the pixel value change. The smoothing process of the fifth embodiment is performed in the same way as the smoothing process of the third embodiment.

FIG. 22B is a diagram showing the display image 61 actually subjected to the smoothing processing by the padding processing of the fifth embodiment. The display image 61 in FIG. 22B is an image generated by performing the smoothing processing in step S51 on the display image 61 shown in FIG. 18B. When referencing a region other than the nucleus region 21 of the display image 61, although the pixel values of adjacent pixels are opened as in the case of FIG. 18B, the pixel values of the pixels are brought closer to each other in the case of FIG. 22B, and a pattern of pixel values that is smooth overall is obtained in a region other than the region 21 of the nucleus.

According to the padding process of the fifth embodiment, similar to the padding process of the third embodiment, the continuity between the background area 91 and the additional image 11*c* of the captured image 11 is improved so that a more natural display image 61 can be generated. Since the smoothing process according to the fifth embodiment is also performed on the entire region other than the nucleus region 21, it is possible to suppress a sense of incompatibility in the entire background portion. However, in the padding process of the fifth embodiment, as shown in FIG. 22B, the background region 91 of the image 11*b* changes from its original state. Therefore, when it is determined that the original image is preferred, it is preferable to generate the display image 61 by the padding processing of the fourth embodiment.

Sixth Embodiment

The sixth embodiment differs from the first embodiment only in the padding process. As shown in FIG. 23A, the padding process of the sixth embodiment is different from the padding process of the first embodiment shown in FIG. 9 in that step S61 is added instead of step S13, and step S62 is added in the latter stage of step S14. Steps different from the padding process of the first embodiment will be described below.

In step S61, the image processing unit 121 sets the pixel value of each pixel of the additional image 11*c* with the average pixel value acquired in step S12. In this way, the pixel value of all the pixels of the additional image 11*c* becomes the average pixel value. In step S14, the additional image 11*c* is added to the image 11*b* to generate a display image 61. Then, in step S62, the image processing unit 121 performs a smoothing process for suppressing pixel value change on the display image 61. The smoothing process of the sixth embodiment is performed in the same manner as the smoothing process of the third embodiment.

FIG. 23B is a diagram showing the display image 61 actually subjected to the smoothing processing by the padding processing of the sixth embodiment. The display image 61 of FIG. 23B is an image generated by performing the smoothing process of step S62 on the image of the comparative example shown in FIG. 12B. Referring to FIG. 23B, pixel values of adjacent pixels are set smoothly in the vicinity of the boundary between the area of the additional image 11*c* and the area other than the additional image 11*c*. That is, according to the padding process of the sixth embodiment, it is understood that an image 61 for natural display is generated as compared with the image of the comparative example of FIG. 12B.

According to the padding process of the sixth embodiment, similar to the padding process of the fifth embodiment, the continuity between the background region 91 and the additional image 11*c* of the captured image 11 is improved so that a more natural display image 61 can be generated. Since the smoothing process according to the sixth embodiment is also executed for the entire region other than the nucleus region 21, a sense of incompatibility in the entire background portion can be suppressed.

What is claimed is:

1. An image display apparatus for imaging and displaying a test substance contained in a sample, the apparatus comprising:
    an imaging unit configured to capture an image of the test substance;
    an image processing unit configured to generate a display image including a region of the test substance by adding an additional image in which pixel values are unevenly distributed to at least a part of the captured image so that the region of the test substance is positioned substantially at a center of the display image; and
    a display unit configured to display the display image.

2. The image display apparatus according to claim 1, wherein
    the image processing unit generates the display image so that a position of the region of the test substance in the captured image and a position of the region of the test substance in the display image are different.

3. The image display apparatus according to claim 1, wherein
    the display unit displays a list of a plurality of display images generated from a same sample.

4. The image display apparatus according to claim 3, wherein
    the imaging unit captures images of a plurality of same type of test substances;

the image processing unit generates the display images so that positions of the region of the test substance in the display images are mutually same for a plurality of captured images based on the plurality of the same type of test substances.

5. The image display apparatus according to claim 4, wherein
the image processing unit generates, for the plurality of captured images, the display images by adding mutually different additional images corresponding to a background region other than the region of the test substance to at least a part of the captured image.

6. The image display apparatus according to claim 3, wherein
the image processing unit sets the display image to a fixed shape and a fixed size.

7. The image display apparatus according to claim 1, wherein
the image processing unit acquires an average pixel value of a background region other than the region of the test substance from the captured image and calculates the pixel value of each pixel of the additional image on the basis of the acquired average pixel value.

8. The image display apparatus according to claim 7, wherein
the image processing unit sets the pixel value of each pixel of the additional image by changing the pixel value for each pixel relative to the average pixel value.

9. The image processing apparatus according to claim 8, wherein
the image processing unit sets the pixel value of each pixel of the additional image by adding a random number of positive or negative polarity to each of the average pixel value of each pixel.

10. The image display apparatus according to claim 7, wherein
the image processing unit sets the pixel value of each pixel of the additional image by acquiring a maximum pixel value and a minimum pixel value of the background region, and adding a random number of positive or negative polarity for each pixel relative to the average pixel value so that the pixel value of each pixel of the additional image is included between at least the maximum pixel value and minimum pixel value.

11. The image display apparatus according to claim 1, wherein
the image processing unit acquires an average pixel value similar to an average pixel value of a background region other than the region of the test substance in the captured image, and sets the pixel value of each pixel of the additional image based on the acquired average pixel value.

12. The image display apparatus according to claim 11, wherein
the image processing unit sets the pixel value of each pixel of the additional image by acquiring a maximum pixel value and a minimum pixel value that are the same as the maximum pixel value and the minimum pixel value of the background region, respectively, and adds the pixel value of each pixel relative to the average pixel value so that the pixel value of each pixel of the additional image is included between at least the acquired maximum pixel value and minimum pixel value.

13. The image display apparatus according to claim 1, wherein
the image processing unit sets the pixel value of each pixel of the additional image so that the pixel values of the additional image are distributed with the same tendency as the frequency distribution of the pixel values of the background region other than the region of the test substance in the captured image.

14. The image display apparatus according to claim 13, wherein
the image processing unit sets the pixel value of each pixel of the additional image by setting a function that defines the relationship between the random number and the pixel value based on the frequency distribution of the pixel values of the background region, and applies the random number to the set function.

15. The image display apparatus according to claim 14, wherein
the image processing unit sets the function that defines the relationship between the random number and the pixel value by acquiring the variance of the frequency distribution of the pixel values of the background region, multiplying the inverse function of the function representing the Gaussian distribution by the acquired variance, and adding the average pixel value of the background region.

16. The image display apparatus according to claim 13, wherein
the image processing unit sets the pixel value of each pixel of the additional image by setting a function that defines the relationship between the random number and the pixel value based on the frequency distribution of the pixel values of the background region, and applies the random number to the set function.

17. The image display apparatus according to claim 16, wherein
the image processing unit sets the function that defines the relationship between the random number and the pixel value by acquiring the variance of the frequency distribution of the pixel values of the background region, multiplying the inverse function of the function representing the Gaussian distribution by the acquired variance, and adding the average pixel value of the background region.

18. The image display apparatus according to claim 1, wherein
the image processing unit sets the pixel value of each pixel of the additional image by acquiring a maximum pixel value and a minimum pixel value of a background region other than a region of the test substance in the captured image, and using a random number that changes in a range between the acquired maximum pixel value and a minimum pixel value of the background region.

19. The image display apparatus according to claim 1, wherein
the image processing unit sets the pixel value of each pixel of the additional image by acquiring a maximum pixel value and a minimum pixel value respectively similar to the maximum pixel value and minimum pixel value of a background region other than a region of the test substance in the captured image, and using a random number that changes in a range between the acquired maximum pixel value and a minimum pixel value of the background region.

20. The image processing apparatus according to claim 1, wherein
the image processing unit executes a smoothing process for suppressing a pixel value change for at least pixels in a vicinity of a boundary between the additional image and a background region of the captured image.

21. An image display apparatus for imaging and displaying a test substance contained in a sample, the apparatus comprising:
an imaging unit configured to capture an image the test substance;
an image processing unit configured to generate a display image including a region of the test substance by adding an additional image in which pixel values are unevenly distributed to at least a part of the captured image so that the region of the test substance is positioned substantially at a center of the display image; and
a display unit configured to display a list of a plurality of display images generated by the image processing unit from a same sample.

22. An image display apparatus for imaging and displaying a test substance contained in a sample, the apparatus comprising:
an imaging unit configured to capture an image the test substance;
an image processing unit configured to generate a display image including a region of the test substance from the captured image;
a display unit configured to display the display image;
wherein the image processing unit is further configured to:
acquire a plurality of statistical values relating to pixel values of a background region other than the region of the test substance from the captured image;
create an additional image in which pixel values are set to be unevenly distributed based on the statistical values; and
generate the display image by adding the additional image to at least a part of the captured image so that the region of the test substance is positioned substantially at a center of the display image.

23. An image display method for imaging and displaying a test substance contained in a sample, the method comprising:
capturing an image of a test substance;
adding an additional image in which pixel values are unevenly distributed to at least a part of the captured image, and generating a display image so that a position of a region of the test substance in the captured image is positioned substantially at a center of the display image; and
displaying the generated display image.

24. An image processing method for generating a display image including a region of a test substance from a captured image obtained by imaging a test substance; the method comprising:
adding an additional image in which pixel values are unevenly distributed to at least a part of the captured image, and generating a display image so that a position of the region of the test substance is positioned substantially at a center of the display image.

25. An image display apparatus for imaging and displaying a test substance contained in a sample, the apparatus comprising:
an imaging unit configured to capture an image of the test substance;
an image processing unit configured to add an additional image in which pixel values are unevenly distributed to at least a part of the captured image, and to generate a display image including a region of the test substance; and
a display unit configured to display the display image,
wherein the image processing unit is further configured to:
acquire an average pixel value of a background region other than the region of the test substance from the captured image; and
calculate the pixel values of at least some pixels of the additional image based on the acquired average pixel value.

26. An image display apparatus for imaging and displaying a test substance contained in a sample, the apparatus comprising:
an imaging unit configured to capture an image of the test substance;
an image processing unit configured to add an additional image in which pixel values are unevenly distributed to at least a part of the captured image, and to generate a display image including a region of the test substance; and
a display unit configured to display the display image,
wherein the image processing unit is further configured to:
acquire an average pixel value similar to an average pixel value of a background region other than the region of the test substance in the captured image; and
set the pixel values of at least some pixels of the additional image based on the acquired average pixel value.

27. An image display apparatus for imaging and displaying a test substance contained in a sample, the apparatus comprising:
an imaging unit configured to capture an image of the test substance;
an image processing unit configured to add an additional image in which pixel values are unevenly distributed to at least a part of the captured image, and to generate a display image including a region of the test substance; and
a display unit configured to display the display image,
wherein the image processing unit is further configured to set the pixel value of at least some pixels of the additional image so that the pixel values of the additional image are distributed with the same tendency as the frequency distribution of the pixel values of the background region other than the region of the test substance in the captured image.

28. An image display apparatus for imaging and displaying a test substance contained in a sample, the apparatus comprising:
an imaging unit configured to capture an image of the test substance;
an image processing unit configured to add an additional image in which pixel values are unevenly distributed on at least a part of the captured image, and to generate a display image including a region of the test substance; and
a display unit configured to display the display image,
wherein the image processing unit is further configured to execute a smoothing process for suppressing a pixel value change for at least pixels in a vicinity of a boundary between the additional image and a background region of the captured image.

\* \* \* \* \*